United States Patent
Bai et al.

(10) Patent No.: US 11,856,432 B2
(45) Date of Patent: Dec. 26, 2023

(54) ACKNOWLEDGEMENT DESIGN FOR MULTI-TRANSMISSION CONFIGURATION INDICATOR STATE TRANSMISSION

(71) Applicant: QUALCOMM Incorporated, San Diego, CA (US)

(72) Inventors: Tianyang Bai, Bridgewater, NJ (US); Makesh Pravin John Wilson, San Diego, CA (US); Kiran Venugopal, Raritan, NJ (US); Tao Luo, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 16/387,856

(22) Filed: Apr. 18, 2019

(65) Prior Publication Data

US 2019/0380053 A1    Dec. 12, 2019

Related U.S. Application Data

(60) Provisional application No. 62/682,478, filed on Jun. 8, 2018.

(51) Int. Cl.
*H04W 24/10* (2009.01)
*H04L 1/18* (2023.01)
(Continued)

(52) U.S. Cl.
CPC ............. *H04W 24/10* (2013.01); *H04L 1/18* (2013.01); *H04W 72/04* (2013.01)

(58) Field of Classification Search
None
See application file for complete search history.

(56) References Cited

U.S. PATENT DOCUMENTS 9,559,820 B2    1/2017 Geirhofer et al.
11,395,299 B2 *  7/2022 Babaei .................. H04L 5/0057
(Continued)

FOREIGN PATENT DOCUMENTS

WO    WO-2012112281 A2    8/2012

OTHER PUBLICATIONS

3GPP TSG RAN WG1 Meeting #90 (R1-1714337) (Year: 2017).*
(Continued)

*Primary Examiner* — Jeffrey M Rutkowski
*Assistant Examiner* — Ning Li
(74) *Attorney, Agent, or Firm* — QUALCOMM Incorporated

(57) ABSTRACT

Methods, systems, and devices for wireless communication are described. A user equipment (UE) may receive, during a transmission interval, a data transmission over a plurality of beamformed channels and, for each data transmission, a reference signal transmitted in conjunction with the data transmission. The UE may perform, for one or more of the plurality of beamformed channels, a channel state measurement procedure during the transmission interval using the data transmission, the reference signal, or a combination thereof. The UE may transmit, over an acknowledgement/negative acknowledgement (ACK/NACK) signal, a feedback report indicating a result of the channel state measurement procedure for the one or more of the plurality of beamformed channels. The base station may perform, based at least in part on the feedback report, subsequent transmissions to the UE over the one or more beamformed channels.

23 Claims, 17 Drawing Sheets

(51) Int. Cl.
  *H04W 72/04* (2023.01)
  *H04L 1/00* (2006.01)
  *H04B 7/06* (2006.01)
  *H04B 7/08* (2006.01)

(56) References Cited

U.S. PATENT DOCUMENTS

| | | | | |
|---|---|---|---|---|
| 2004/0014429 A1* | 1/2004 | Guo | H04B 7/0632 | 455/73 |
| 2014/0328266 A1* | 11/2014 | Yu | H04B 7/0617 | 370/329 |
| 2016/0165458 A1* | 6/2016 | Peng | H04W 16/32 | 370/329 |
| 2018/0062711 A1* | 3/2018 | Mizusawa | H04B 7/0469 | |
| 2018/0062724 A1* | 3/2018 | Onggosanusi | H04L 5/0053 | |
| 2018/0083680 A1* | 3/2018 | Guo | H04L 5/0007 | |
| 2018/0288781 A1* | 10/2018 | Akkarakaran | H04J 1/02 | |
| 2018/0323850 A1* | 11/2018 | Baligh | H04W 36/0094 | |
| 2018/0343629 A1* | 11/2018 | Choi | H04L 5/005 | |
| 2019/0132851 A1* | 5/2019 | Davydov | H04B 7/088 | |
| 2019/0173533 A1* | 6/2019 | Kim | H04B 7/0408 | |
| 2019/0215136 A1* | 7/2019 | Zhou | H04B 7/0456 | |
| 2019/0253949 A1* | 8/2019 | Park | H04W 36/305 | |
| 2019/0268060 A1* | 8/2019 | Nam | H04B 7/0695 | |
| 2020/0015239 A1* | 1/2020 | Guey | H04W 72/005 | |
| 2020/0099437 A1* | 3/2020 | Harada | H04W 76/19 | |
| 2020/0100219 A1* | 3/2020 | Takeda | H04L 5/0053 | |
| 2020/0154467 A1* | 5/2020 | Gong | H04W 24/08 | |
| 2020/0244413 A1* | 7/2020 | Takeda | H04W 74/0833 | |
| 2020/0288479 A1* | 9/2020 | Xi | H04B 7/02 | |
| 2020/0389220 A1* | 12/2020 | Kang | H04B 7/0695 | |
| 2020/0396664 A1* | 12/2020 | Kakishima | H04W 36/305 | |
| 2020/0404617 A1* | 12/2020 | Murray | H04B 7/0695 | |
| 2021/0028847 A1* | 1/2021 | Bedekar | H04B 7/0452 | |
| 2021/0067215 A1* | 3/2021 | Song | H04B 7/0639 | |
| 2021/0311805 A1* | 10/2021 | Nakamura | G06F 9/5038 | |

OTHER PUBLICATIONS

3GPP TSG RAN WG1 Meeting #89 (R1-1708134) (Year: 2017).*
Huawei et al., "DL Beam Management", 3GPP TSG RAN WG 1 Meeting #89, 3GPP Draft; R1-1708134, 3rd Generation Partnership Project (3GPP), Mobile Competence Centre, 650, Route Des Lucioles ; F-06921 Sophia-Antipolis Cedex, France, vol. RAN WG1, No. Hangzhou; May 15, 2017-May 19, 2017, May 14, 2017 (May 14, 2017), 11 Pages, XP051273330, Retrieved from the Internet: URL: http://www.3gpp.org/ftp/Meetings_3GPP_SYNC/RAN1/Docs/ [retrieved on May 14, 2017].
Huawei et al., "Multi-Beam Transmission for DL Control Channel", 3GPP Draft; R1-1719811, 3rd Generation Partnership Project (3GPP), Mobile Competence Centre, 650, Route Des Lucioles, F-06921 Sophia-Anti Polis Cedex, France, vol. RAN WG1, No. Reno, USA; Nov. 27, 2017-Dec. 1, 2017, Nov. 17, 2017 (Nov. 17, 2017), 4 Pages, XP051369189, Retrieved from the Internet: URL: https://www.3gpp.org/ftp/tsg_ran/WG1_RL1/TSGR1_91/Docs/ [retrieved on Nov. 17, 2017].
Huawei et al., "Multi-Beam Transmission for Robustness", 3GPP TSG RAN WG 1 Meeting #89, 3GPP Draft; R1-1708136, 3rd Generation Partnership Project (3GPP), Mobile Competence Centre, 650, Route Des Lucioles ; F-06921 Sophia-Antipolis Cedex, France, vol. RAN WG1, No. Hangzhou; China, May 15, 2017-May 19, 2017, May 14, 2017 (May 14, 2017), pp. 1-5, XP051273332, Retrieved from the Internet: URL: http://www.3gpp.org/ftp/Meetings_3GPP_SYNC/RAN1/Docs/ [retrieved on May 14, 2017], Section 2, figures 2,3, Section 2.2.
Huawei et al., "Measurement RS for Beam Management", 3GPP TSG RAN WG 1 Meeting #90, 3GPP Draft; R1-1714337, 3rd Generation Partnership Project (3GPP), Mobile Competence Centre, 650, Route Des Lucioles ; F-06921 Sophia-Antipolis Cedex, France, vol. RAN WG1, No. Prague, Czech Republic; Aug. 21, 2017-Aug. 25, 2017, Aug. 20, 2017 (Aug. 20, 2017), 3 Pages, XP051317122, Retrieved from the Internet: URL: http://www.3gpp.org/ftp/Meetings_3GPP_SYNC/RAN1/Docs/ [retrieved on Aug. 20, 2017], Section 2.
International Search Report and Written Opinion—PCT/US2019/028353—ISA/EPO—dated Aug. 8, 2019.
Taiwan Search Report—TW108113928—TIPO—dated Nov. 17, 2022.
Taiwan Search Report—TW108113928—TIPO—dated Jun. 27, 2023.

* cited by examiner

ACKNOWLEDGEMENT DESIGN FOR MULTI-TRANSMISSION CONFIGURATION INDICATOR STATE TRANSMISSION

CROSS REFERENCES

The present application for patent claims the benefit of U.S. Provisional Patent Application No. 62/682,478 by Bai, et al., entitled "Acknowledgement Design for Multi-Transmission Configuration Indicator State Transmission," filed Jun. 8, 2018, assigned to the assignee hereof, and expressly incorporated by reference herein.

BACKGROUND

The following relates generally to wireless communications, and more specifically to acknowledgement design for multi-transmission configuration indicator (TCI) state transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 26 GHz, 28 GHz, 39 GHz, 40 GHz, 57-71 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station or the UE may be beamformed. Moreover, a receiving device may use beamforming techniques to configure antenna(s) or antenna array(s) such that transmissions are received in a directional manner.

In conventional wireless communications systems, such as a mmW wireless network, a data transmission (e.g., physical downlink shared channel (PDSCH)) may be transmitted on a single transmission configuration indicator (TCI) beam state (e.g., a beamformed transmission) to a UE. Reference signals transmitted along with the TCI beam state, e.g., channel state information-reference signal (CSI-RS), synchronization signal block (SSB), and the like, are typically used by the UE to monitor the channel conditions, e.g., how well the channel is performing, for the TCI beam state. For example, the reference signals may be used by the UE to determine whether the TCI beam state is blocked or unblocked. However, these techniques suffer from delays between triggering the CSI-RS/SSB and their resultant transmission, the increased overhead for CSI-RS/SSB, and the like. Moreover, such conventional techniques do not provide macro-diversity for the PDSCH transmission, are inefficient in terms of resources used for the feedback reports, and the like.

SUMMARY

The described techniques relate to improved methods, systems, devices, and apparatuses that support acknowledgement design for multi-transmission configuration indicator (TCI) state transmission. Generally, the described techniques provide a mechanism to support acknowledgement/negative acknowledgement (ACK/NACK) feedback report design for multi-TCI beam state transmissions. In some examples, the described techniques provide for data transmission on multiple beams to improve macro diversity, use a demodulation reference signal (DMRS) and the data transmission (e.g., physical downlink shared channel (PDSCH)) in the slot to estimate the channel state information, and use the ACK/NACK of the physical uplink control channel (PUCCH) in the slot to feedback the channel state information (CSI) report. For example, a base station and user equipment (UE) may be performing wireless communications that involve the base station transmitting a data transmission over a plurality beamformed channels to the UE. In some examples, each data transmission may have one or more reference signals transmitted using the same beamformed channel. The UE may use the data transmission or the corresponding reference signal for each beamformed channel to perform a channel state measurement procedure during the transmission interval. In some examples, the UE may perform the channel state measurement procedure for one or more of the plurality beamformed channels, e.g., for a subset of the beamformed channels. The UE may transmit a feedback report indicating the result of the channel state measurement procedure for the one or more of the plurality beam from channels. In some examples, the UE may communicate the feedback report over an ACK/NACK signal in the PUCCH using one or more transmit beams. The base station may use the feedback report when performing subsequent communications with the UE, e.g., to help identify the best transmit beams to use for the subsequent transmissions to the UE over the beamformed channels.

A method of wireless communication at a UE is described. The method may include receiving, during a transmission interval, a data transmission over a set of beamformed channels and, for each data transmission, a reference signal transmitted in conjunction with the data transmission, performing, for one or more of the set of beamformed channels, a channel state measurement procedure during the transmission interval using the data transmission, the reference signal, or a combination, and transmitting, over an ACK/NACK signal, a feedback report indicating a result of the channel state measurement procedure for the one or more of the set of beamformed channels.

An apparatus for wireless communication at a UE is described. The apparatus may include a processor, memory in electronic communication with the processor, and instructions stored in the memory. The instructions may be executable by the processor to cause the apparatus to receive, during a transmission interval, a data transmission over a set of beamformed channels and, for each data transmission, a reference signal transmitted in conjunction with the data transmission, perform, for one or more of the set of beamformed channels, a channel state measurement procedure during the transmission interval using the data transmission, the reference signal, or a combination, and transmit, over an ACK/NACK signal, a feedback report indicating a result of the channel state measurement procedure for the one or more of the set of beamformed channels.

Another apparatus for wireless communication at a UE is described. The apparatus may include means for receiving, during a transmission interval, a data transmission over a set of beamformed channels and, for each data transmission, a reference signal transmitted in conjunction with the data transmission, performing, for one or more of the set of beamformed channels, a channel state measurement procedure during the transmission interval using the data transmission, the reference signal, or a combination, and transmitting, over an ACK/NACK signal, a feedback report indicating a result of the channel state measurement procedure for the one or more of the set of beamformed channels.

A non-transitory computer-readable medium storing code for wireless communication at a UE is described. The code may include instructions executable by a processor to receive, during a transmission interval, a data transmission over a set of beamformed channels and, for each data transmission, a reference signal transmitted in conjunction with the data transmission, perform, for one or more of the set of beamformed channels, a channel state measurement procedure during the transmission interval using the data transmission, the reference signal, or a combination, and transmit, over an ACK/NACK signal, a feedback report indicating a result of the channel state measurement procedure for the one or more of the set of beamformed channels.

Some examples of the method, apparatuses, and non-transitory computer-readable medium described herein may further include operations, features, means, or instructions for determining that a control transmission received during the transmission interval may be transmitted using an antenna configuration that may be quasi-co-located (QCL) with respect to an antenna configuration used for the data transmission and performing, for the one or more of the set of beamformed channels, the channel state measurement procedure during the transmission interval using the control transmission.

Some examples of the method, apparatuses, and non-transitory computer-readable medium described herein may further include operations, features, means, or instructions for identifying resources allocated for transmitting an ACK/NACK message for the transmission interval and using the identified resources for transmitting the feedback report and the ACK/NACK message.

Some examples of the method, apparatuses, and non-transitory computer-readable medium described herein may further include operations, features, means, or instructions for identifying, for each of the set of beamformed channels, a receive beam used to receive the data transmission and selecting, based on the respective receive beam, a transmit beam to use for transmitting the feedback report.

Some examples of the method, apparatuses, and non-transitory computer-readable medium described herein may further include operations, features, means, or instructions for identifying, based on the channel state measurement procedure, a channel performance metric value associated with the receive beam, determining that the channel performance metric value fails to satisfy a threshold, and where transmitting the feedback report is based on the determining.

Some examples of the method, apparatuses, and non-transitory computer-readable medium described herein may further include operations, features, means, or instructions for transmitting the feedback report over a set of transmit beams, each transmit beam associated with a corresponding receive beam used to receive the data transmission.

In some examples of the method, apparatuses, and non-transitory computer-readable medium described herein, the feedback report indicates at least one of a SNR, a reference signal received power (RSRP), a channel quality indicator (CQI), a reference signal received quality (RSRQ), or a combination.

In some examples of the method, apparatuses, and non-transitory computer-readable medium described herein, the feedback report indicates at least one of an indication of an absolute channel performance metric value for each of the one or more of the set of beamformed channels, a relative channel performance metric value for the one or more of the set of beamformed channels, an identifier for each of the one or more beamformed channels having a channel performance metric value satisfying a threshold, an identifier of at least one beamformed channel having a highest channel performance metric value, or a combination.

In some examples of the method, apparatuses, and non-transitory computer-readable medium described herein, each of the set of beamformed channels corresponds to a channel using a corresponding TCI state beam.

In some examples of the method, apparatuses, and non-transitory computer-readable medium described herein, the reference signal includes a DMRS.

A method of wireless communication at a base station is described. The method may include transmitting, during a transmission interval, a data transmission over a set of beamformed channels to a UE and, for each data transmission, a reference signal transmitted in conjunction with the data transmission, receiving, from the UE and over an ACK/NACK signal, a feedback report indicating a result of a channel state measurement procedure for one or more of the set of beamformed channels using the data transmission, the reference signal, or a combination, and performing, based on the feedback report, subsequent transmissions to the UE over the one or more beamformed channels.

An apparatus for wireless communication at a base station is described. The apparatus may include a processor, memory in electronic communication with the processor, and instructions stored in the memory. The instructions may be executable by the processor to cause the apparatus to transmit, during a transmission interval, a data transmission over a set of beamformed channels to a UE and, for each data transmission, a reference signal transmitted in conjunction with the data transmission, receive, from the UE and over an ACK/NACK signal, a feedback report indicating a result of a channel state measurement procedure for one or more of the set of beamformed channels using the data transmission, the reference signal, or a combination, and perform, based on the feedback report, subsequent transmissions to the UE over the one or more beamformed channels.

Another apparatus for wireless communication at a base station is described. The apparatus may include means for transmitting, during a transmission interval, a data transmission over a set of beamformed channels to a UE and, for each data transmission, a reference signal transmitted in conjunction with the data transmission, receiving, from the UE and over an ACK/NACK signal, a feedback report indicating a result of a channel state measurement procedure for one or more of the set of beamformed channels using the data transmission, the reference signal, or a combination, and performing, based on the feedback report, subsequent transmissions to the UE over the one or more beamformed channels.

A non-transitory computer-readable medium storing code for wireless communication at a base station is described. The code may include instructions executable by a processor to transmit, during a transmission interval, a data transmission over a set of beamformed channels to a UE and, for each data transmission, a reference signal transmitted in conjunction with the data transmission, receive, from the UE and over an ACK/NACK signal, a feedback report indicating a result of a channel state measurement procedure for one or more of the set of beamformed channels using the data transmission, the reference signal, or a combination, and perform, based on the feedback report, subsequent transmissions to the UE over the one or more beamformed channels.

Some examples of the method, apparatuses, and non-transitory computer-readable medium described herein may further include operations, features, means, or instructions for transmitting a control transmission during the transmission interval using an antenna configuration that may be QCL with respect to an antenna configuration used for the data transmission, where the channel state measurement procedure may be performed using the control transmission.

Some examples of the method, apparatuses, and non-transitory computer-readable medium described herein may further include operations, features, means, or instructions for receiving the feedback report over resources allocated for transmitting an ACK/NACK message.

Some examples of the method, apparatuses, and non-transitory computer-readable medium described herein may further include operations, features, means, or instructions for receiving the feedback report over a transmit beam that may be based on a receive beam used by the UE to receive the data transmission.

Some examples of the method, apparatuses, and non-transitory computer-readable medium described herein may further include operations, features, means, or instructions for identifying, based on the feedback report, a channel performance metric value associated with the receive beam, determining that the channel performance metric value fails to satisfy a threshold, where performing subsequent transmissions to the UE is based on the determining.

Some examples of the method, apparatuses, and non-transitory computer-readable medium described herein may further include operations, features, means, or instructions for receiving the feedback report over a set of transmit beams, each transmit beam associated with a corresponding receive beam used by the UE to receive the data transmission.

Some examples of the method, apparatuses, and non-transitory computer-readable medium described herein may further include operations, features, means, or instructions for transmitting an indication to the UE identifying one or more transmit beams for the UE to use for communicating the feedback report over the ACK/NACK signal.

In some examples of the method, apparatuses, and non-transitory computer-readable medium described herein, the feedback report indicates at least one of a SNR, a RSRP, a CQI, a RSRQ, or a combination.

In some examples of the method, apparatuses, and non-transitory computer-readable medium described herein, the feedback report indicates at least one of an indication of an absolute channel performance metric value for each of the one or more of the set of beamformed channels, a relative channel performance metric value for the one or more of the set of beamformed channels, an identifier for each of the one or more beamformed channels having a channel performance metric value satisfying a threshold, an identifier of at least one beamformed channel having a highest channel performance metric value, or a combination.

In some examples of the method, apparatuses, and non-transitory computer-readable medium described herein, each of the set of beamformed channels corresponds to a channel using a corresponding TCI state beam.

In some examples of the method, apparatuses, and non-transitory computer-readable medium described herein, the reference signal includes a DMRS.

DETAILED DESCRIPTION

Figure 1:
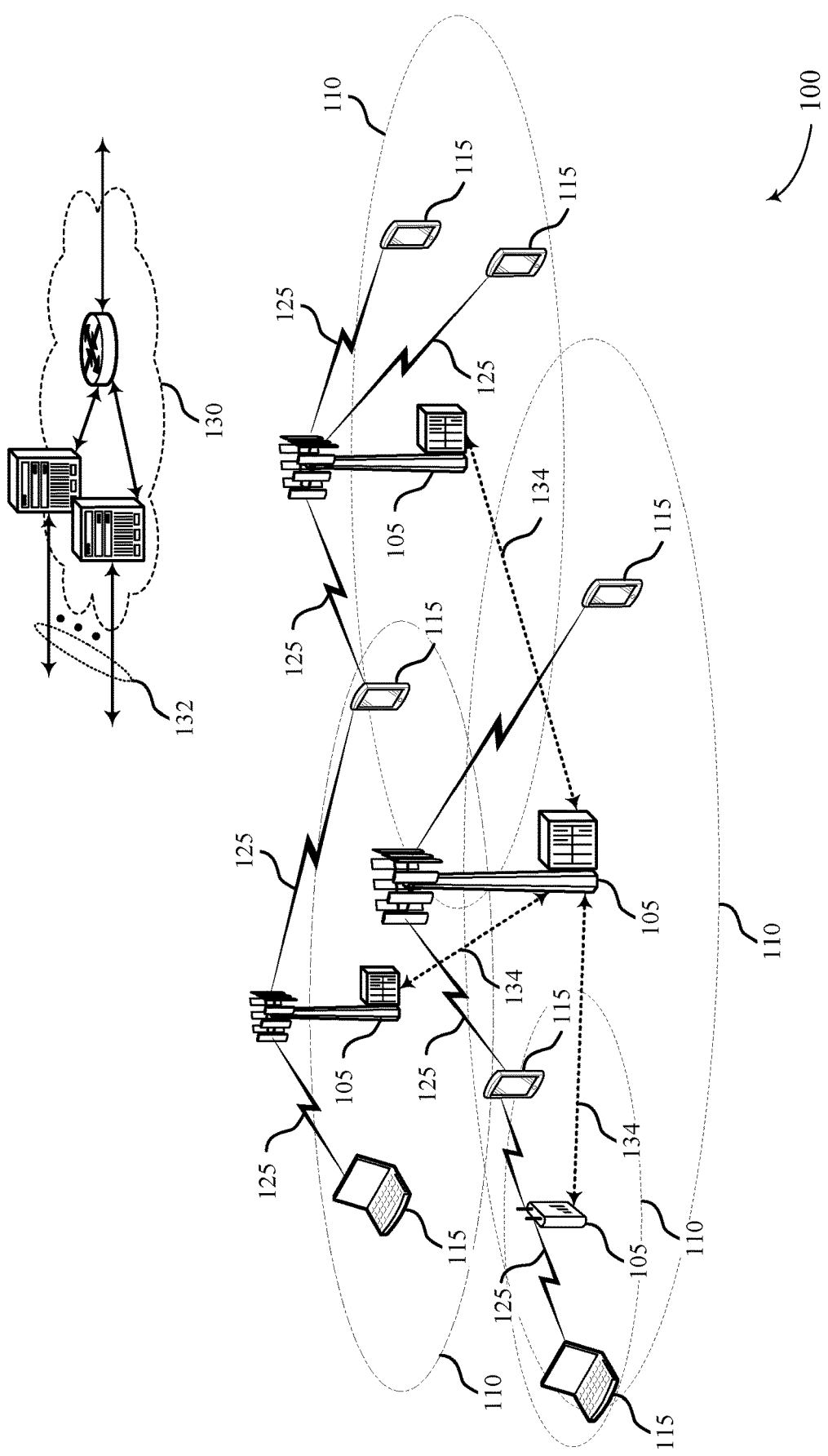
FIG. 1 illustrates an example of a system for wireless communications that supports acknowledgement design for multi-transmission configuration indicator (TCI) state transmission in accordance with aspects of the present disclosure.

Some wireless communication systems may operate in millimeter wave (mmW) frequency ranges (e.g., 26 GHz, 28 GHz, 39 GHz, 40 GHz, 57-71 GHz, etc.). In some examples, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some examples, a device may select an active beam for communicating with a network by selecting the strongest beam from among a number of candidate beams.

In some examples, wireless communication systems, such as a mmW wireless network, may utilize a single beamformed signal to transmit a data transmission (e.g., physical downlink shared channel (PDSCH) to a user equipment (UE). In some examples, this may not provide sufficient macro diversity, which may be particularly problematic in a mmW where the beamformed channel can be so easily blocked, e.g., such as by a person walking in front of the UE, a user switching their grip on the UE, and the like. Moreover, conventional reporting techniques are inefficient in terms of over the air resources.

Aspects of the disclosure are initially described in the context of a wireless communication system, such as a mmW wireless network. Broadly, the described techniques provide for an efficient mechanism that improves macro diversity and conserves valuable resources used to communicate reports between the UE and the base station. For example, the UE may receive a data transmission during a transmission interval through multiple beamformed channels (e.g., channels that correspond to different transmission configuration indicator (TCI) beam states). In some examples, one or more reference signals may also be included in the transmission for each of the plurality of beamformed channels. In some examples, the UE may use the data transmission or the corresponding reference signal transmission in the transmission interval to perform a channel state measurement procedure. In some examples, the UE may perform the channel state measurement procedure for one, some, or all of the beamformed channels. In some examples, the UE may transmit a feedback report to the base station that includes information indicative of the results of the channel state measurement procedure. In some examples, the UE may use one or more resources associated with acknowledgment/negative acknowledgment (ACK/NACK) message to communicate the feedback report. For example, the UE may use ACK/NACK resources from the physical uplink control (PUCCH) in the transmission interval (e.g., slot, mini-slot, and the like) to provide the feedback report. In some examples, the base station may use the feedback report when performing subsequent transmissions to the UE, e.g., to help identify the best transmit beams to use for the subsequent communications. Accordingly, the data transmission may have improved macro diversity using multiple beamformed transmissions (e.g., TCI beam states) and the feedback report may conserve valuable over the air resources.

Aspects of the disclosure are further illustrated by and described with reference to apparatus diagrams, system diagrams, and flowcharts that relate to acknowledgement design for multi-TCI state transmission.

FIG. 1 illustrates an example of a wireless communications system 100 that supports acknowledgement design for multi-TCI state transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some examples, UEs 115 may be designed to support critical functions (e.g., mission critical functions), and a wireless communications system 100 may be configured to provide ultra-reliable communications for these functions.

In some examples, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, the base station 105 or the UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may, in some examples, perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some examples, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some examples, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some examples, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, a base station 105 may transmit, during a transmission interval, a data transmission over a plurality of beamformed channels to a UE 115 and, for each data transmission, a reference signal transmitted in conjunction with the data transmission. The base station 105 may receive, from the UE 115 and over an ACK/NACK signal, a feedback report indicating a result of a channel state measurement procedure for one or more of the plurality of beamformed channels using the data transmission, the reference signal, or a combination thereof. The base station 105 may perform, based at least in part on the feedback report, subsequent transmissions to the UE 115 over the one or more beamformed channels.

In some examples, a UE 115 may receive, during a transmission interval, a data transmission over a plurality of beamformed channels and, for each data transmission, a reference signal transmitted in conjunction with the data transmission. The UE 115 may perform, for one or more of the plurality of beamformed channels, a channel state measurement procedure during the transmission interval using the data transmission, the reference signal, or a combination thereof. The UE 115 may transmit, over an ACK/NACK signal, a feedback report indicating a result of the channel state measurement procedure for the one or more of the plurality of beamformed channels.

Figure 2:
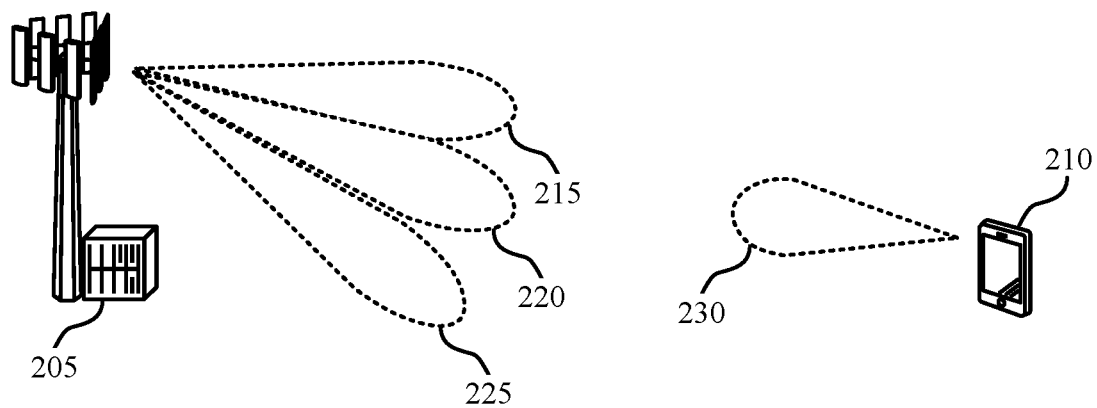
FIG. 2 illustrates an example of a system for wireless communications that supports acknowledgement design for multi-TCI state transmission in accordance with aspects of the present disclosure.

FIG. 2 illustrates an example of a wireless communication system 200 that supports acknowledgement design for multi-TCI state transmission in accordance with aspects of the present disclosure. In some examples, wireless communication system 200 may implement aspects of wireless communication system 100. Wireless communications system 200 may include a base station 205 and a UE 210, which may be examples of the corresponding devices described herein. In some examples, wireless communication system may be a mmW wireless network.

Generally, the base station 205 may be performing wireless communications with the UE 210 using various beamformed channels. For example, the base station 205 may be transmitting a data transmission to the UE 210 over beamformed channels 215, 220, and 225. In some examples, each of beamformed channels 215, 220, and 225 may correspond to or otherwise be associated with a different TCI state beam. In some examples, the TCI state beam may include or otherwise be associated with a label or identifier for a beamformed transmission, e.g., such as a beam Index.

In some examples, the data transmissions to the UE 210 may be performed during a transmission interval. For example, the transmission interval, or sometimes referred to as TI, may include a mini-slot, a slot, subframe, the transmission opportunity (TxOP), and the like. For example purposes only, a transmission interval may often be referred to as a slot herein.

In some examples, the beamformed channels 215, 220, and 225 may form a plurality of beamformed channels. In some examples, reference signal(s) may also be communicated in conjunction with the data transmission (e.g., during the transmission interval). For example, the base station 205 may, during the transmission interval, also transmit the reference signal(s) over the beamformed channels 215, 220, or 225. Examples of the reference signal include, but are not limited to, a DMRS, a CSI-RS, a position tracking reference signal, a beam management reference signal, and the like.

In some examples, control signals may also be transmitted during the transmission interval over the beamformed channels 215, 220, or 225. For example, the control transmission may include physical downlink control channel (PDCCH) information communicated to the UE 210. In some examples, one or more of the control transmissions may be quasi-co-located (QCL) with respect to the corresponding data transmission. For example, the data transmissions over the beamformed channels 215, 220, and 225 may be transmitted using an antenna configuration that is associated with a particular beam direction, beam shape, angle of departure, transmit power, and the like. The corresponding control transmission may be QCL in that it is also transmitted using an antenna configuration that is the same as, or within a predefined range of, the antenna configuration used for the data transmission. In some examples, the control transmission may be transmitted during the transmission interval on one, some, or all of the beamformed channels 215, 220, or 225. When transmitted, the control transmission may be QCL with one, some, or all of the corresponding data transmissions.

In some examples, the UE 210 may receive the data transmissions over one or more receive beams, such as a beam 230. In some examples, the UE 210 may identify a receive beam, such as the beam 230, by a cycling through one or more receive beams during the data transmissions to identify a best receive beam of the UE 210. Accordingly, the UE 210 may identify the best receive beams used to receive each of the corresponding data transmissions.

In some examples, the UE 210 may perform a channel state measurement procedure during the transmission for one, some, or all of the beamformed channels 215, 220, and 225. For example, the UE 210 may use the data transmission or the reference signals transmitted in conjunction with the data transmission during the transmission interval over the respective beamformed channel to perform the channel state measurement procedure. Generally, the channel state measurement procedure may determine or otherwise identify, for the corresponding beamformed channel, an indicator or metric associated with how well the beamformed channel is performing. For example, the beamformed channel may be performing well in terms of received power at the UE 210, a low error rate, low interference level, a high throughput, and the like. In some examples, the channel measurement procedure may identify, for the corresponding beamformed channel, a signal-to-noise ratio (SNR), a reference signal received power (RSRP), a reference signal received quality (RSRQ), a channel quality indicator (CQI), and the like.

In some examples, the UE 210 may also use control transmissions that are transmitted during the transmission interval in conjunction with the data transmission over the corresponding beamformed channel. For example, the UE 210 may receive control transmissions over a beamformed channel in conjunction with the data transmission (and corresponding reference signal transmission) and determine whether the control transmission is QCL with respect to the corresponding data transmission. If so, the UE 210 may use the control transmission when performing the channel state measurement procedure. When the control transmissions are present and QCL with respect to the corresponding data transmissions, the UE 210 may use one, some, or all of the control transmissions when performing the channel state measurement procedure.

In some examples, the UE 210 may transmit a feedback report to the base station 205 that includes or otherwise provides an indication of a result of the channel state measurement procedure for the corresponding beamformed channel. In some examples, the feedback report may be transmitted over an ACK/NACK signal, e.g., in PUCCH. For example, the UE 210 may identify resources that are allocated or otherwise signed for transmitting an ACK/NACK message for the transmission interval (e.g., for the corresponding data transmissions) and use the resources for transmitting the feedback report and the ACK/NACK message. For example, the UE 210 may include the ACK/NACK information for the corresponding data transmission for this transmission interval or a previous transmission interval and also configure the ACK/NACK message to indicate the results of the channel state measurement procedure. For example, the UE 210 may configure one or more bits, fields, and the like within the ACK/NACK message to provide an indication of the results of the channel state measurement procedure. In some examples and for each beamformed channel included in the feedback report, the UE 210 may configure the feedback report to identify the corresponding beamformed channel.

In some examples, the feedback report may include, for each beamformed channel that the channel state measurement procedure was performed on, an absolute or relative indication of the corresponding result. For example, the feedback report may include, for each beamformed channel that the channel state measurement procedure was performed on, the corresponding result, e.g., CQI, SNR, and the like. As another example, the feedback report may simply identify the best beamformed channel, e.g., include an identifier for the beamformed channel having the highest RSRQ, the best throughput, the highest received power level, and the like, with respect to the other beamformed channels. As another example, the feedback report may identify the best beamformed channel and also include an indication of the results of the other beamformed channels relative to the best beamformed channel. As another example, the feedback report may only identify the beamformed channels that are performing above a threshold level. In contrast, the feedback report may only identify the beamformed channels that are performing below a threshold level, e.g., identify the poor beamformed channels.

In some examples, the UE 210 may transmit the feedback report over one or more transmit beams, such as a beam 230. For example, the UE 210 may use the best receive beam identified during the transmission interval to determine or otherwise identify a best transmit beam to use to transmit the feedback report. In other aspects, the base station 205 may configure the UE 210 with one or more transmit beams to use to transmit the feedback report. For example, the base station 205 may configure ACK/NACK resources for communicating the ACK/NACK message, which may identify the transmit beam that the UE 210 is to use.

In some examples, the UE 210 may transmit the feedback report over multiple transmit beams. For example, the UE 210 may identify the receive beam that was used to receive the data transmissions over the corresponding beamformed channel and use this information to identify an associated transmit beam to use for communicating the feedback report over the ACK/NACK message. the UE 210 may use some or all of the identified transmit beams for transmitting the feedback report to the base station 205.

In some examples, the base station 205 may use the information contained in or otherwise indicated by the feedback report for performing subsequent transmissions to the UE 210. For example, the base station 205 may identify which beamformed channel performed the best, or above a threshold level, and use this information to select the beamformed channel(s) for performing subsequent control transmissions, data transmissions, and the like, to the UE 210. The base station 205 may perform the subsequent transmissions to the UE 210 using one or more beamformed channels selected based at least in part on the feedback report.

Thus, the UE 210 may receive a data transmission in a transmission interval through multiple beamformed channels. In some examples, the multiple beamformed channels may correspond to different TCI state beams. In some examples, reference signal(s), e.g., DMRS, may be transmitted in conjunction with each of the beamformed channels. In some examples, the data transmission may occur using a downlink-centric mini-slot slot containing PDSCH symbols.

In some examples, the UE 210 may estimate a channel state information metric (e.g., channel state measurement) based on the received beamformed transmission for at least one (or a subset) of the beamformed channels during the transmission interval. In some examples, the channel state information metric may include any one of SNR, RSRP, CQI, and RSRQ, and the like, of the beamformed channels used for the PDSCH transmission. The estimation may be based on the received DMRS or PDSCH symbols in the transmission interval. In some examples, the channel estimation may be based on PDCCH symbols (e.g., control transmissions) occurring in the transmission interval, such as when the PDCCH symbol is QCL with the PDSCH transmission.

As described herein, the UE 210 may estimate a channel state information metric associated with a beam (e.g., for a beamformed channel 215, 220, or 225). In some examples, the UE 210 may provide feedback based on determining whether the measurement (e.g., the channel state measurement) satisfies a threshold. For example, the UE 210 may determine that the channel state information metric (e.g., a RSRP measurement) satisfies a statically preconfigured threshold or a threshold configured according to received system information from the base station 205. Based on the determination, the UE 210 may refrain from transmitting feedback to the base station 205. By refraining from transmitting feedback signaling on resources of a beamformed channel, the UE 210 may reduce signaling overhead. In other examples, the UE 210 may determine that the measured channel state information metric (e.g., a RSRP measurement) fails to satisfy a threshold. Based on the determination, the UE 210 may feedback information related to the received beam. The UE 210 may transmit the feedback for the received beam using an alternative beam associated with the beamformed channels. In some examples, the channel state information associated with the alternative beam may satisfy the threshold.

In some examples, the UE 210 may feedback the CSI estimation using the ACK/NAK signal for the transmission interval. For example, the UE 210 may feedback (quantized) absolute values for each beamformed channel. The UE 210 may feedback absolute values for one beamformed channel, and differential value(s) for the other beamformed channel(s). In some examples, the UE 210 may feedback the best beamformed channel indication. For example, when two beams are used, the UE 210 may use one bit (in addition to the ACK/NACK signal) to indicate a relative relationship (e.g., which beam has a higher CQI). As one non-limiting example, the UE 210 may configure the feedback signal to include '1' to indicate the first beam has lower performance, and '0' to indicate that the second beam is better in terms of performance. In some examples, the UE 210 may use the ACK/NACK signal to transmit the feedback report by determining at least one of a signaling from a second device or according to a defined method. In some examples, the UE 210 may transmit the feedback report through multiple transmit beams. In the example where multiple transmit beams are used, each transmit beam may correspond to a receive beam in the transmission interval. In some examples, the UE 210 may transmit the feedback report using one transmit beam. In this example, the transmit beam may correspond to a receive beam in the transmission interval. In some examples, the relative relationship of which beamformed channel is best may be conveyed at least in part by the choice of PUCCH beam for the ACK/NACK signal. For example, the information may indicate if the receive beam corresponding to the transmit beam used for ACK/NACK is the highest/lowest value (e.g., in a two beam case, if the PUCCH is transmitted on one of the beams, a '1' may indicate the PUCCH beam has a higher CQI).

In some examples, the base station 205 may transmit a signal to the UE 210 indicating the configuration of the ACK/NACK signal, e.g., which transmit beam to use to transmit the ACK/NACK signal (and by extension the feedback report).

Figure 3:
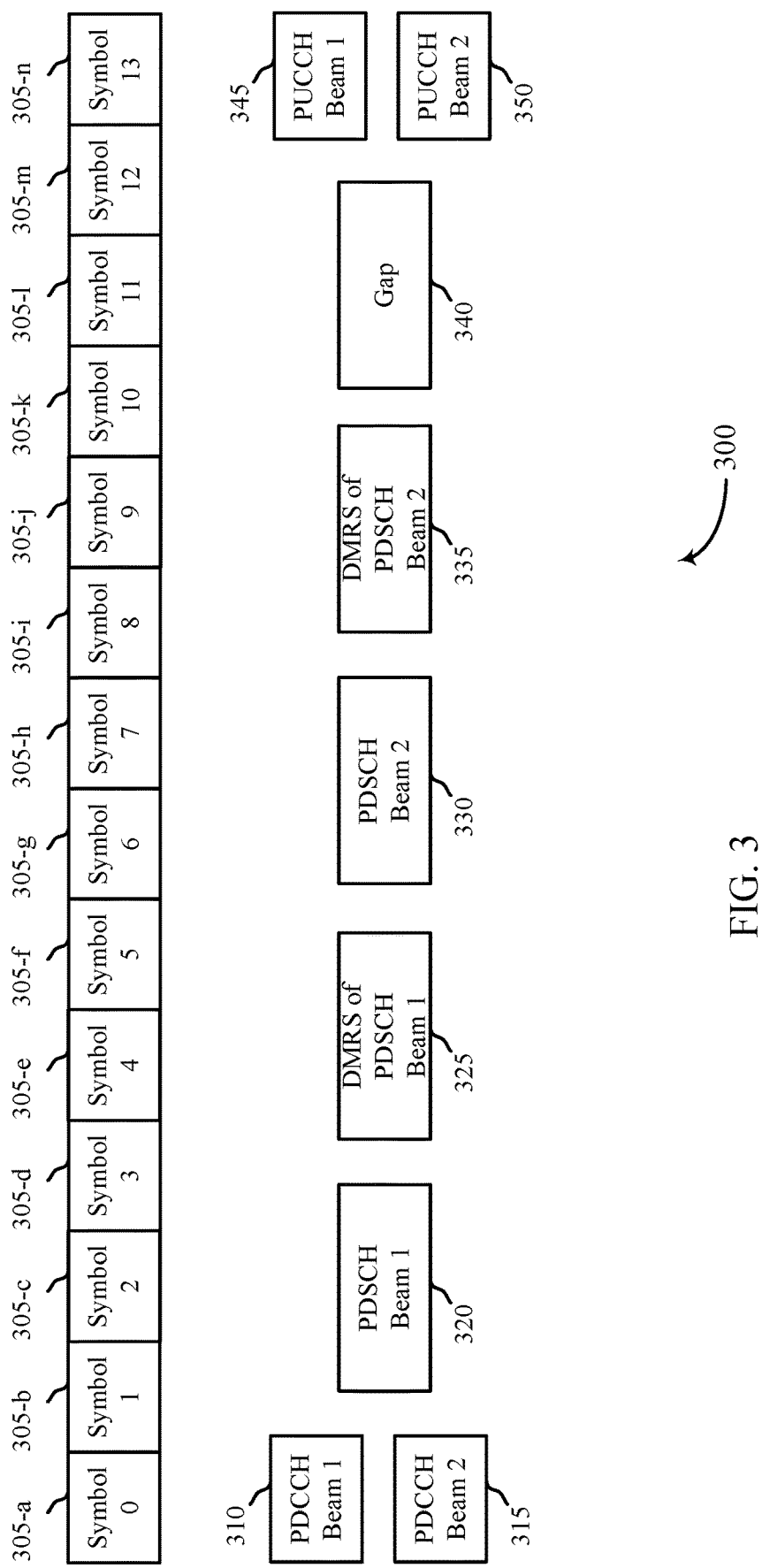
FIG. 3 illustrates an example of a slot configuration that supports acknowledgement design for multi-TCI state transmission in accordance with aspects of the present disclosure.

FIG. 3 illustrates an example of a slot configuration 300 that supports acknowledgement design for multi-TCI state transmission in accordance with aspects of the present disclosure. In some examples, slot configuration 300 may implement aspects of wireless communication systems 100/200. Aspects of the slot configuration 300 may be performed by a base station or UE, which may be examples of corresponding devices described herein.

Generally, slot configuration 300 may include a plurality of symbols 305, with 14 symbols 305 being shown by way of example only. Aspects of the described techniques may be performed using a slot configuration having more or fewer symbols 305. In some examples, slot configuration 300 may be a transmission interval.

During symbol 305-*a*, a base station may transmit a control transmission 310 (e.g., PDCCH) to a UE on beam 1. In some examples, beam one may correspond to a beamformed channel, such as a first TCI beam. In some examples, control transmission 310 may be transmitted using a defined antenna configuration that is QCL with respect to an antenna configuration used for a corresponding data transmission. During symbol 305-*b*, the base station may transmit a control transmission 315 (e.g., PDCCH) to the UE on beam 2. In some examples, beam 2 may correspond to a certain beamformed channel, such as a second TCI beam. In some examples, control transmission 315 may be transmitted using a defined antenna configuration that is QCL with respect to an antenna configuration used for a corresponding data transmission.

During symbol 305-*c*, the base station may transmit a reference signal 325 (e.g., a DMRS) on beam 1. During symbols 305-*d* through 305-*f*, the base station may transmit a data transmission 320 (e.g., PDSCH) to the UE on beam 1. During symbol 305-*g*, the base station may transmit a reference signal 335 (e.g., a DMRS) on beam 2. During symbols 305-*h* through 305-*k*, the base station may transmit a data transmission 330 to the UE on beam 2. Symbol 305-*l* may be used as a gap 340 which allows the UE to transition from downlink communications to uplink communications, e.g., reconfigure one or more components, operations, and the like. Generally, beam 1 and beam 2 may correspond to a plurality of beamformed channels.

During symbol 305-*m*, the UE may transmit a feedback report over an ACK/NACK signal 345 (e.g., PUCCH) to the base station on beam 1. During symbol 305-*n*, the UE may transmit the feedback report over an ACK/NACK signal 350 (e.g., PUCCH) to the base station on beam 2.

Thus, the UE may receive during slot configuration 300 a data transmission over a plurality beamformed channels (e.g., beam 1 and beam 2) and, for each data transmission, a reference signal transmitted on the corresponding beamformed channel (e.g., on beam 1 and beam 2). For one or both of beam 1 and beam 2, the UE may perform a channel state measurement procedure during slot configuration 300 using the data transmissions 320/330 or the corresponding reference signal transmissions 325/335, respectively. The UE may transmit, over an ACK/NACK signals 345/350, a feedback report over two transmit beams, in the example slot configuration 300. In some examples, the feedback report may include or otherwise provide an indication of a result of the channel state measurement procedure for beams 1 and 2. For example, the feedback report may include the results of the channel state measurement procedure, e.g., CQI, along with the ACK/NACK signals 345/350. In some examples, the feedback report may include an absolute value or a differential value, e.g., an absolute value for beam 1 and a relative value (e.g., the delta with respect to beam 1) for beam 2. In some examples, the feedback report (e.g., CQI, RSRP, and the like) may be based on the data transmissions 320/330 and the corresponding reference signals 325/335 (e.g., DMRS) for each beam. In some examples, the feedback report (e.g., CQI, RSRP, and the like) may be based on control transmissions 310/315 that are QCL with the data transmissions 320/330.

As described herein, the UE may estimate a channel state information metric associated with a beam. In some examples, the UE may transmit the feedback report based on determining whether a measurement (e.g., the result of the channel state measurement) satisfies or fails to satisfy a threshold. For instance, the UE may estimate a channel state information metric (e.g., CQI, RSRP, and the like) associated with a beam (e.g., beam 1). In some examples, the UE may determine that the channel state information metric satisfies a statically preconfigured threshold or a threshold configured according to received system information from the base station. Based on the determination, the UE may refrain from transmitting the feedback report to the base station. By refraining from transmitting feedback signaling on resources of a beamformed channel, the UE may reduce signaling overhead. In other examples, the UE may determine that the measured channel state information metric fails to satisfy a threshold. Based on the determination, the UE may determine to transmit the feedback report for the received beam (e.g., beam 1). In some examples, the UE may transmit the feedback report for the received beam (e.g., beam 1) using an alternative beam associated with the beamformed channels. In some examples, the channel state information associated with the alternative beam (e.g., beam 2) may satisfy the threshold.

The base station may utilize the feedback report for subsequent transmissions to the UE, e.g., may use the information indicated in the feedback report to select beam(s) to use for future transmissions to the UE.

Figure 4:
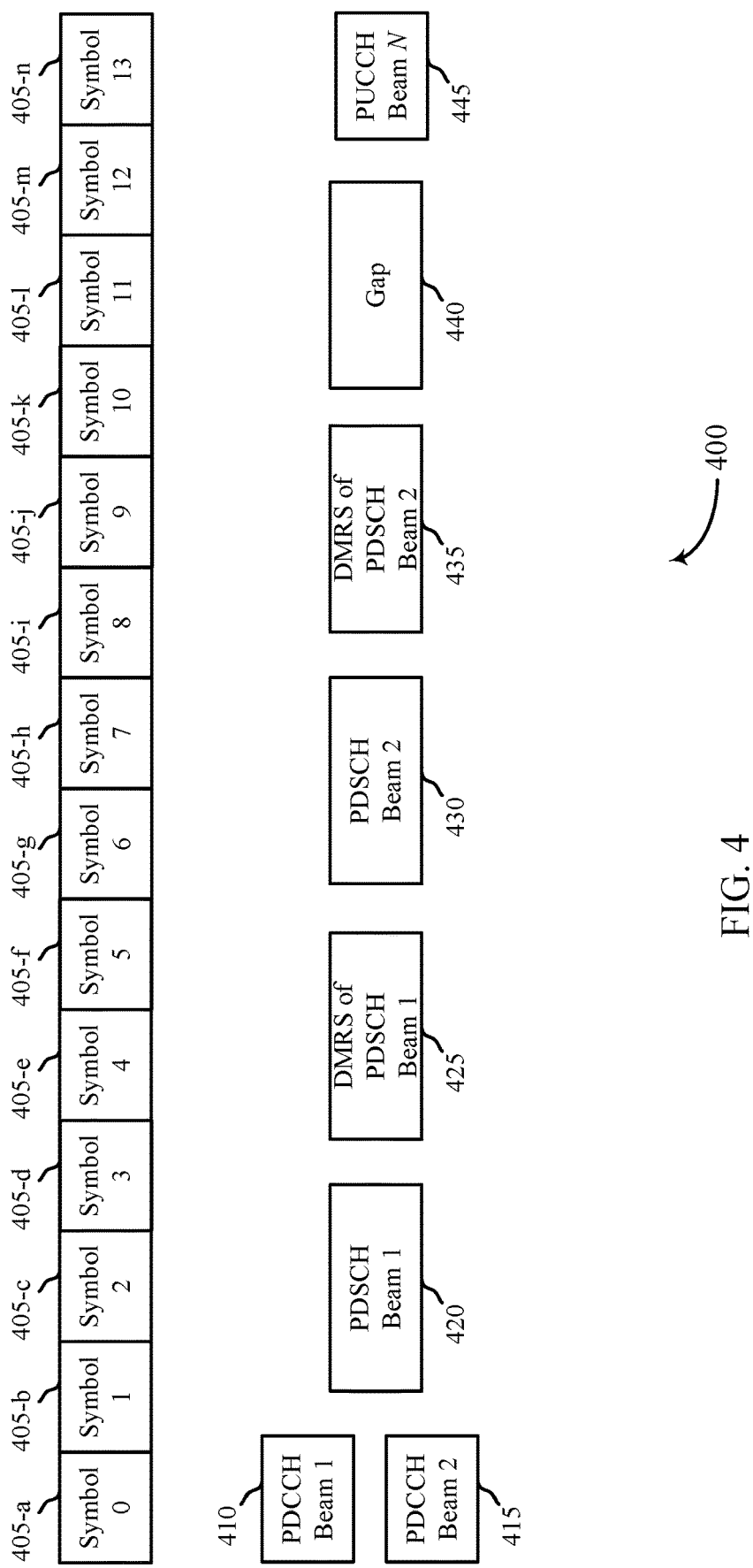
FIG. 4 illustrates an example of a slot configuration that supports acknowledgement design for multi-TCI state transmission in accordance with aspects of the present disclosure.

FIG. 4 illustrates an example of a slot configuration 400 that supports acknowledgement design for multi-TCI state transmission in accordance with aspects of the present disclosure. In some examples, slot configuration 400 may implement aspects of wireless communication systems 100/200. Aspects of the slot configuration 400 may be performed by a base station or UE, which may be examples of corresponding devices described herein.

Generally, slot configuration 400 may include a plurality of symbols 405, with 14 symbols 405 being shown by way of example only. Aspects of the described techniques may be performed using a slot configuration having more or fewer symbols 405. In some examples, slot configuration 400 may be a transmission interval.

During symbol 405-*a*, a base station may transmit a control transmission 410 (e.g., PDCCH) to a UE on beam 1. In some examples, beam 1 may correspond to a beamformed channel, such as a first TCI beam. In some examples, control transmission 410 may be transmitted using a defined antenna configuration that is QCL with respect to an antenna configuration used for a corresponding data transmission. During symbol 405-*b*, the base station may transmit a control transmission 415 (e.g., PDCCH) to the UE on beam 2. In some examples, beam 2 may correspond to a certain beamformed channel, such as a second TCI beam. In some examples, control transmission 415 may be transmitted using a defined antenna configuration that is QCL with respect to an antenna configuration used for a corresponding data transmission.

During symbol 405-*c*, the base station may transmit a reference signal 425 (e.g., a DMRS) on beam 1. During symbols 405-*d* through 405-*f*, the base station may transmit a data transmission 420 (e.g., PDSCH) to the UE on beam 1. During symbol 405-*g*, the base station may transmit a reference signal 435 (e.g., a DMRS) on beam 2. During symbols 405-*h* through 405-1, the base station may transmit a data transmission 430 to the UE on beam 2. Symbol 405-*m* may be used as a gap 440 which allows the UE to transition from downlink communications to uplink communications, e.g., reconfigure one or more components, operations, and the like.

During symbol 405-*n*, the UE may transmit a feedback report over an ACK/NACK signal 445 (e.g., PUCCH) to the base station on beam N. Generally, beam N may refer to a transmit beam selected based at least in part on the channel state measurement procedure performed on beams 1 and 2. For example, beam N may be beam 1, beam 2, or some other beam selected based on the channel state measurement procedure. In some examples, the selection of beam N is indicated in a signaling sent by base station to the UE.

In some examples, if the PUCCH is on beam 1, and 1 bit information regarding CSI is conveyed together with ACK/NACK signal 445, configuring the feedback report using '1' may indicate that beam 1 has better channel performance, higher CQI, and the like, than the other beam (e.g., beam 2). In some examples, the feedback report can use alternative PDSCH beam for PUCCH in every other slot for reporting. In some aspect, PUCCH may be transmitted on a different beam other than two PDSCH beams, e.g., other than beam 1 or beam 2. In some examples, the feedback report may be based on defined rules, e.g., use 1 bit for CSI where '1' indicates the lowest number TCI beam is better and '0' indicates the opposite.

Thus, the UE may receive during slot configuration 400 a data transmission over a plurality beamformed channels (e.g., beam 1 and beam 2) and, for each data transmission, a reference signal transmitted on the corresponding beamformed channel (e.g., beam 1 and beam 2). For one or both of beam 1 and beam 2, the UE may perform a channel state measurement procedure during slot configuration 400 using the data transmissions 420/430 or the corresponding reference signal transmissions 425/435, respectively. The UE may transmit, over an ACK/NACK signal 445, a feedback report over one transmit beam, in the example slot configuration 400. In some examples, the feedback report may include or otherwise provide an indication of a result of the channel state measurement procedure for beams 1 and 2. The base station may utilize the feedback report for subsequent transmissions to the UE, e.g., may use the information indicated in the feedback report to select beam(s) to use for future transmissions to the UE.

Figure 5:
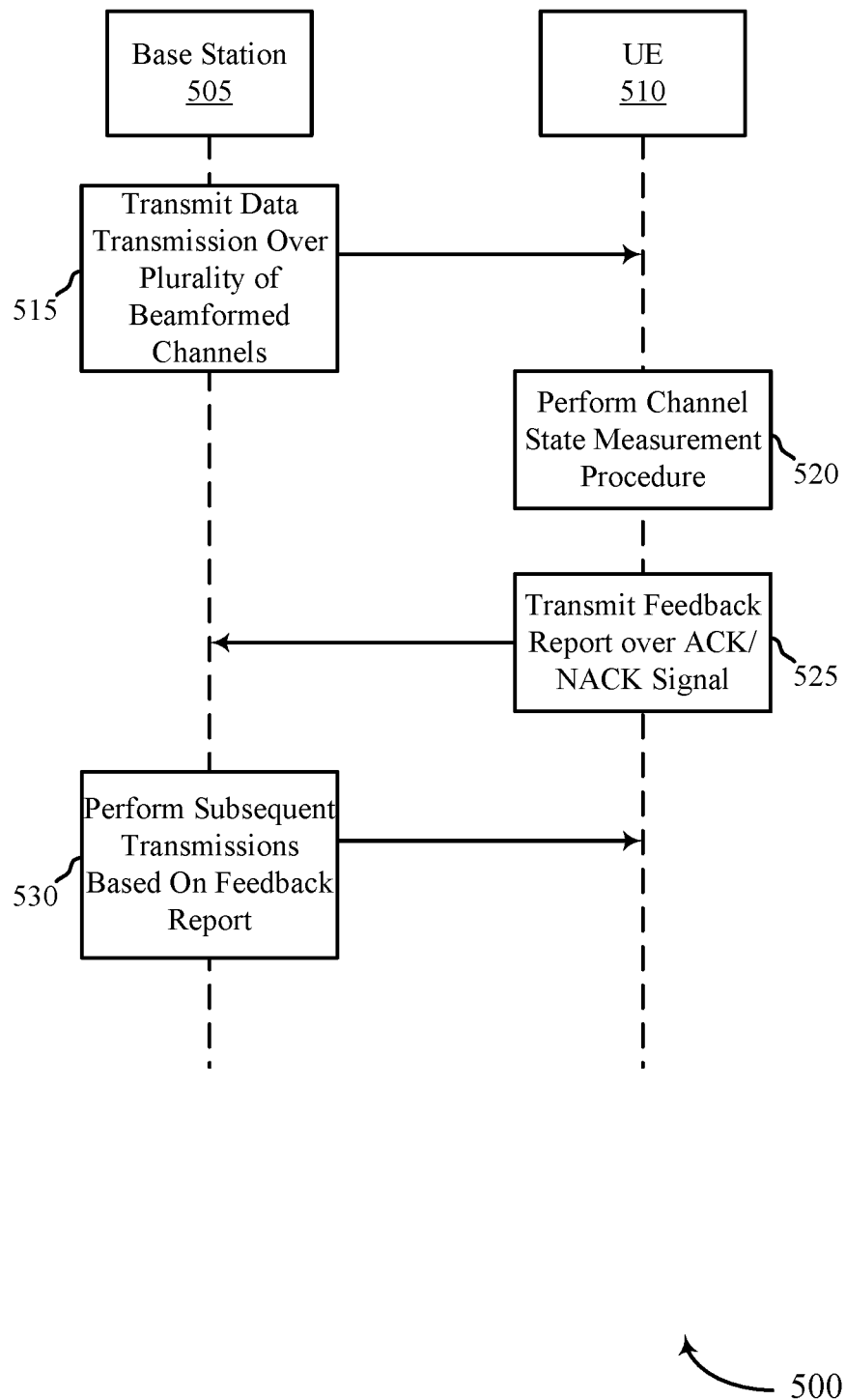
FIG. 5 illustrates an example of a process that supports acknowledgement design for multi-TCI state transmission in accordance with aspects of the present disclosure.

FIG. 5 illustrates an example of a process 500 that supports acknowledgement design for multi-TCI state transmission in accordance with aspects of the present disclosure. In some examples, process 500 may implement aspects of wireless communication systems 100/200 or slot configurations 300/400. Aspects of process 500 may be performed by a base station 505 or a UE 510, which may be examples of corresponding devices described herein, including with reference to FIGS. 1-4.

At 515, the base station 505 may transmit (and the UE 510 may receive) a data transmission over a plurality of beamformed channels during a transmission interval. In some examples, each data transmission transmitted over each beamformed channel may have a corresponding reference signal transmitted during the transmission interval. In some examples, transmission interval may refer to a mini-slot, a slot, a TxOP, and the like. In some examples, each of the plurality beamformed channels may correspond to a channel using the corresponding TCI state beam. In some examples, the reference signal may include a DMRS.

At 520, the UE 510 may perform, for one or more of the plurality of beamformed channels a channel state measurement procedure during the transmission interval using the data transmission or the corresponding reference signal transmission. In some examples, this may include the UE 510 determining that a control transmission was received during the transmission interval and transmitted using an antenna configuration that is QCL with respect to an antenna configuration used for the corresponding data transmission. In this aspect, the UE 510 may also use the control transmission when performing the channel state measurement procedure.

At 525, the UE 510 may transmit (and the base station 505 may receive) a feedback report indicating a result of the channel state measurement procedure for the one or more of the plurality of beamformed channels. In some examples, the UE 510 may transmit the feedback report over an ACK/NACK signal. In some examples, this may include the UE 510 identifying resources that are allocated for transmitting an ACK/NACK message for the transmission interval. the UE 510 may use these resources for transmitting the feedback report and the ACK/NACK message.

In some examples, this may include the UE 510 identifying, for each beamformed channel, a receive beam used to receive the data transmission. In this aspect, the UE 510 may select a transmit beam to use for transmitting the feedback report based on the respective received beam. In some examples, this may include the UE 510 transmitting the feedback report over a plurality of transmit beam, e.g., each of the transmit beams being associated with a corresponding receive beam used to receive the data transmission.

In some examples, the base station 505 may transmit an indication to the UE 510 identifying one or more transmit beams for the UE 510 to use for communicating the feedback report over the ACK/NACK signal. Accordingly, the UE 510 may use the indicated transmit beam(s) for providing the feedback report.

In some examples, the feedback report may include or otherwise provide an indication of a SNR, RSRP, CQI, or RSRQ for the corresponding beamformed channel. In some examples, the feedback report may include or otherwise provide an indication of an absolute channel performance metric value for each of the plurality of beamformed channels, a relative channel performance metric value for the one or more of the plurality of beamformed channels, an identifier for each of the one or more beamformed channels having a channel performance metric value satisfying a threshold, or an identifier of at least one beamformed channel having a highest channel performance metric value.

At 530, the base station 505 perform one or more subsequent transmissions to the UE 510 over the one or more beamformed channels based at least in part on the feedback report. For example, the base station 505 may use the information included or otherwise indicated in the feedback report when selecting transit beams for the subsequent transmissions to the UE 510.

Figure 6:
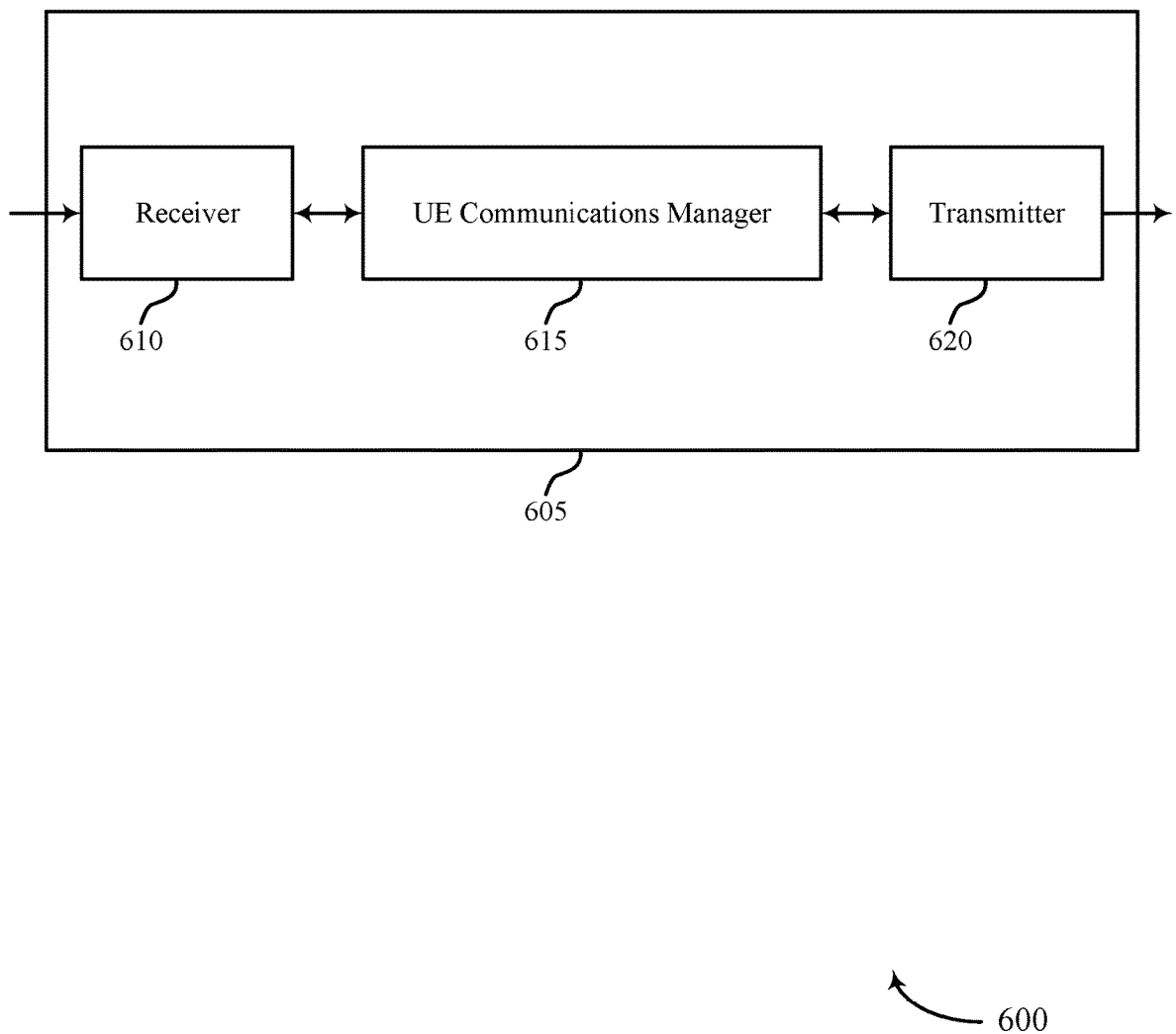
FIGS. 6 and 7 show block diagrams of devices that support acknowledgement design for multi-TCI state transmission in accordance with aspects of the present disclosure.

FIG. 6 shows a block diagram 600 of a device 605 that supports acknowledgement design for multi-TCI state transmission in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to acknowledgement design for multi-TCI state transmission, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive, during a transmission interval, a data transmission over a set of beamformed channels and, for each data transmission, a reference signal transmitted in conjunction with the data transmission, perform, for one or more of the set of beamformed channels, a channel state measurement procedure during the transmission interval using the data transmission, the reference signal, or a combination thereof, and transmit, over an ACK/NACK signal, a feedback report indicating a result of the channel state measurement procedure for the one or more of the set of beamformed channels. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
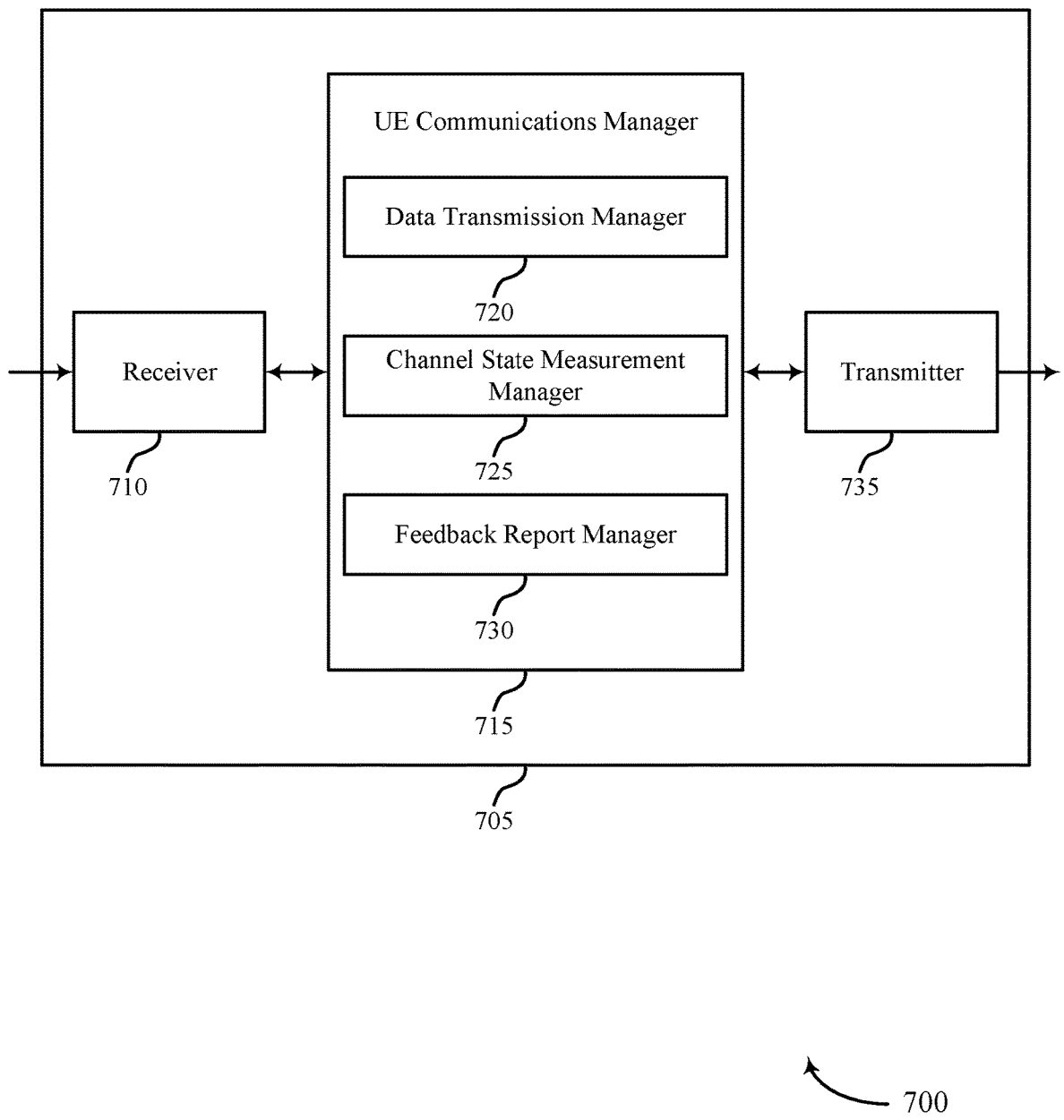

FIG. 7 shows a block diagram 700 of a device 705 that supports acknowledgement design for multi-TCI state transmission in accordance with aspects of the present disclosure. The device 705 may be an example of aspects of a device 605 or a UE 115 as described herein, including with reference to FIGS. 1-6. The device 705 may include a receiver 710, a UE communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to acknowledgement design for multi-TCI state transmission, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a data transmission manager 720, a channel state measurement manager 725, and a feedback report manager 730. The UE communications manager 715 may be an example of aspects of the UE communications manager 910 described herein.

The data transmission manager 720 may receive, during a transmission interval, a data transmission over a set of beamformed channels and, for each data transmission, a reference signal transmitted in conjunction with the data transmission.

The channel state measurement manager 725 may perform, for one or more of the set of beamformed channels, a channel state measurement procedure during the transmission interval using the data transmission, the reference signal, or a combination thereof.

The feedback report manager 730 may transmit, over an ACK/NACK signal, a feedback report indicating a result of the channel state measurement procedure for the one or more of the set of beamformed channels.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
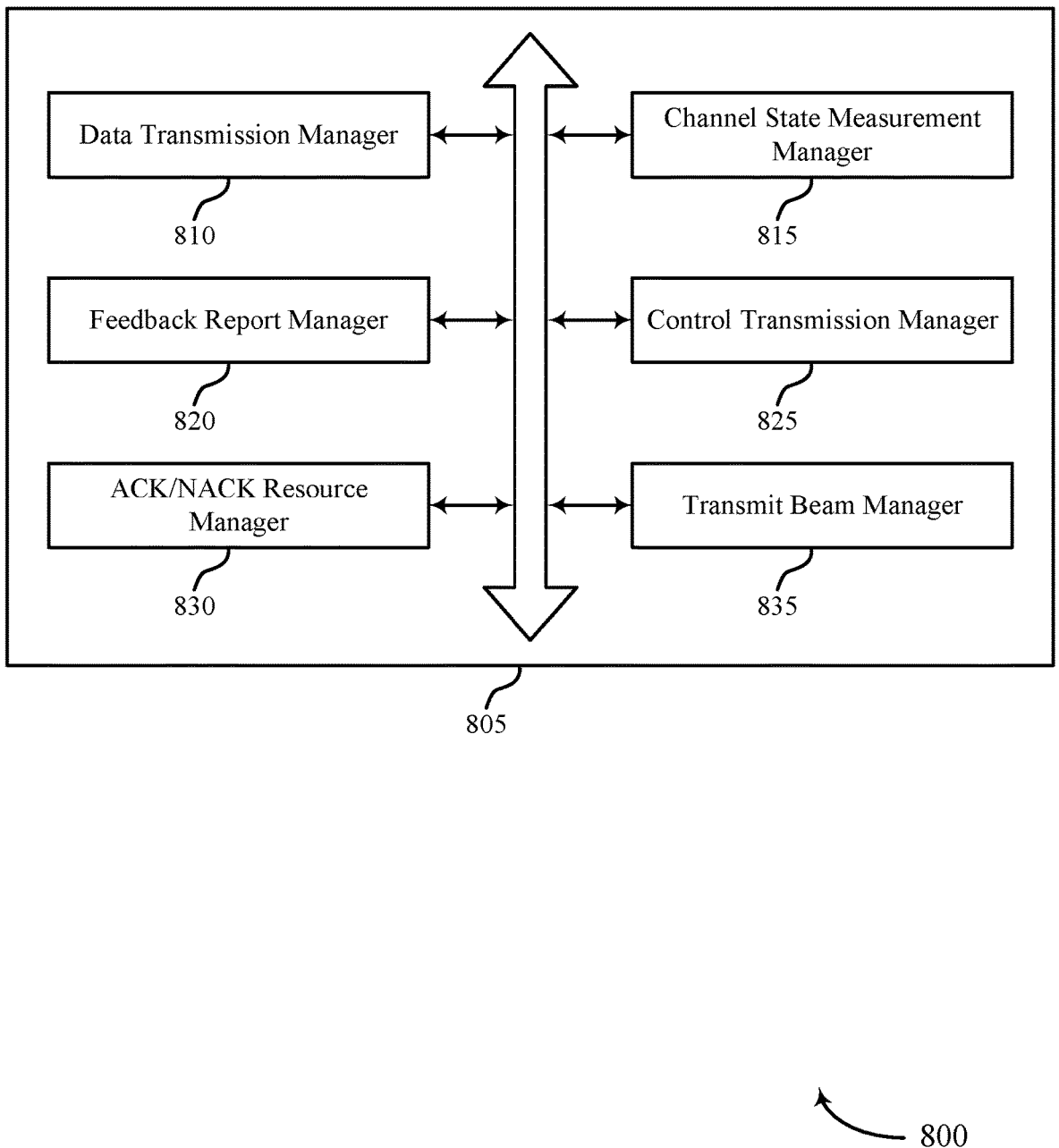
FIG. 8 shows a block diagram of a communications manager that supports acknowledgement design for multi-TCI state transmission in accordance with aspects of the present disclosure.

FIG. 8 shows a block diagram 800 of a UE communications manager 805 that supports acknowledgement design for multi-TCI state transmission in accordance with aspects of the present disclosure. The UE communications manager 805 may be an example of aspects of a UE communications manager 615, a UE communications manager 715, or a UE communications manager 910 as described herein, including with reference to FIGS. 6, 7, and 9. The UE communications manager 805 may include a data transmission manager 810, a channel state measurement manager 815, a feedback report manager 820, a control transmission manager 825, an ACK/NACK resource manager 830, and a transmit beam manager 835. Each of these modules may communicate, directly or indirectly, with one another (e.g., via one or more buses).

The data transmission manager 810 may receive, during a transmission interval, a data transmission over a set of beamformed channels and, for each data transmission, a reference signal transmitted in conjunction with the data transmission. In some examples, each of the set of beamformed channels corresponds to a channel using a corresponding TCI state beam. In some examples, the reference signal includes a DMRS.

The channel state measurement manager 815 may perform, for one or more of the set of beamformed channels, a channel state measurement procedure during the transmission interval using the data transmission, the reference signal, or a combination thereof.

The feedback report manager 820 may transmit, over an ACK/NACK signal, a feedback report indicating a result of the channel state measurement procedure for the one or more of the set of beamformed channels. In some examples, the feedback report indicates at least one of a SNR, a RSRP, a CQI, a RSRQ, or a combination thereof. In some examples, the feedback report indicates at least one of an indication of an absolute channel performance metric value for each of the one or more of the set of beamformed channels, a relative channel performance metric value for the one or more of the set of beamformed channels, an identifier for each of the one or more beamformed channels having a channel performance metric value satisfying a threshold, an identifier of at least one beamformed channel having a highest channel performance metric value, or a combination thereof.

The control transmission manager 825 may determine that a control transmission received during the transmission interval is transmitted using an antenna configuration that is QCL with respect to an antenna configuration used for the data transmission. In some examples, the control transmission manager 825 may perform, for the one or more of the set of beamformed channels, the channel state measurement procedure during the transmission interval using the control transmission.

The ACK/NACK resource manager 830 may identify resources allocated for transmitting an ACK/NACK message for the transmission interval. In some examples, the ACK/NACK resource manager 830 may use the identified resources for transmitting the feedback report and the ACK/NACK message.

The transmit beam manager 835 may identify, for each of the set of beamformed channels, a receive beam used to receive the data transmission. In some examples, the transmit beam manager 835 may identify, based at least in part on the channel state measurement procedure, a channel performance metric value associated with the receive beam. In some examples the transmit beam manager 835 may determine that the channel performance metric value fails to satisfy a threshold.

In some examples, the transmit beam manager 835 may select, based on the respective receive beam, a transmit beam to use for transmitting the feedback report. In some examples, the transmit beam manager 835 may transmit the feedback report over a set of transmit beams, each transmit beam associated with a corresponding receive beam used to receive the data transmission.

Figure 9:
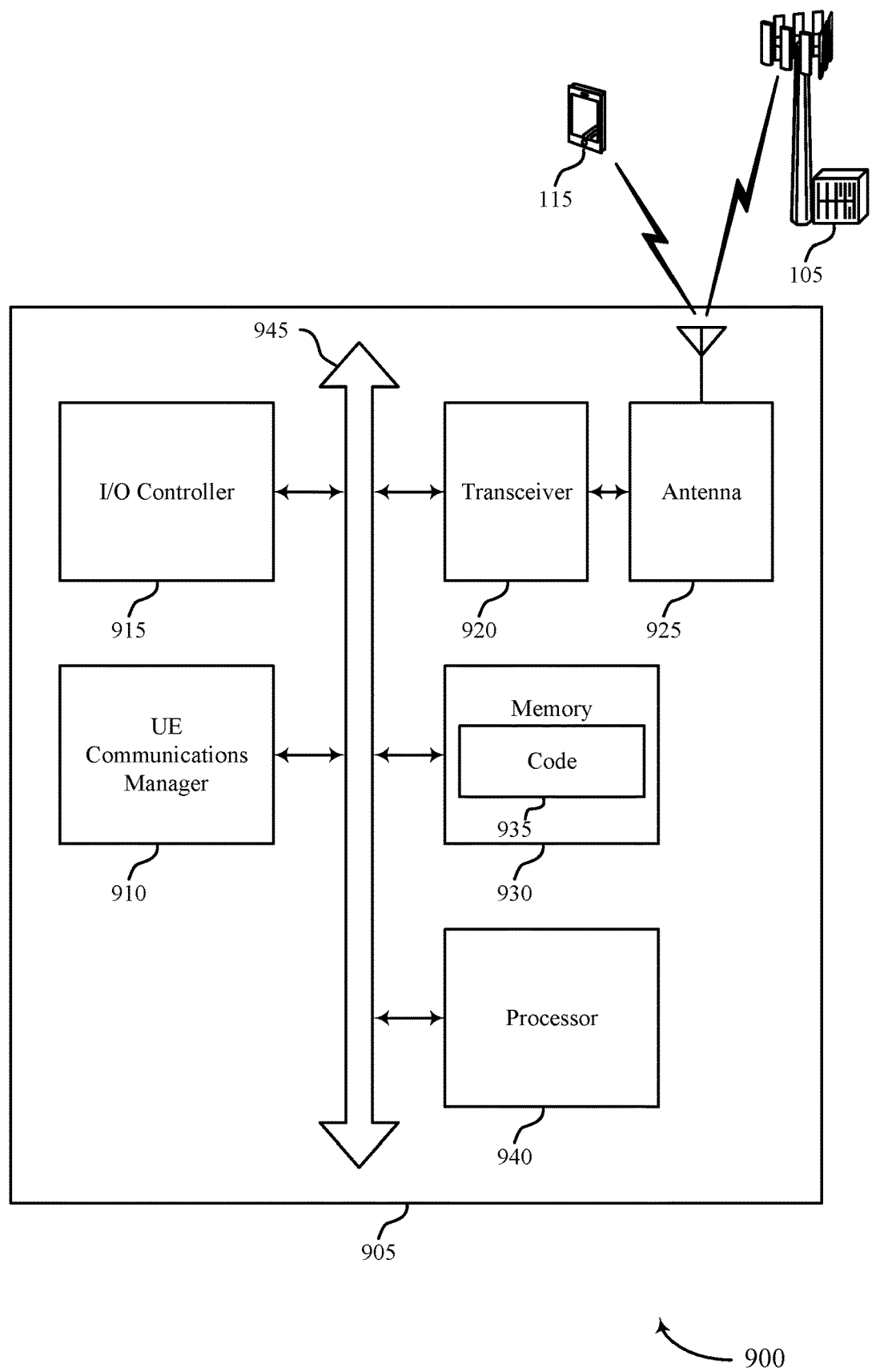
FIG. 9 shows a diagram of a system including a device that supports acknowledgement design for multi-TCI state transmission in accordance with aspects of the present disclosure.

FIG. 9 shows a diagram of a system 900 including a device 905 that supports acknowledgement design for multi-TCI state transmission in accordance with aspects of the present disclosure. The device 905 may be an example of or include the components of device 605, device 705, or a UE 115 as described herein, including with reference to FIGS. 6, 7, and 9. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive, during a transmission interval, a data transmission over a set of beamformed channels and, for each data transmission, a reference signal transmitted in conjunction with the data transmission, perform, for one or more of the set of beamformed channels, a channel state measurement procedure during the transmission interval using the data transmission, the reference signal, or a combination thereof, and transmit, over an ACK/NACK signal, a feedback report indicating a result of the channel state measurement procedure for the one or more of the set of beamformed channels.

The I/O controller 915 may manage input and output signals for the device 905. The I/O controller 915 may also manage peripherals not integrated into the device 905. In some examples, the I/O controller 915 may represent a physical connection or port to an external peripheral. In some examples, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some examples, the I/O controller 915 may be implemented as part of a processor. In some examples, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some examples, the wireless device may include a single antenna 925. However, in some examples the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some examples, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting acknowledgement design for multi-TCI state transmission).

The code 935 may include instructions to implement aspects of the present disclosure, including instructions to support wireless communications. The code 935 may be stored in a non-transitory computer-readable medium such as system memory or other type of memory. In some examples, the code 935 may not be directly executable by the processor 940 but may cause a computer (e.g., when compiled and executed) to perform functions described herein.

Figure 10:
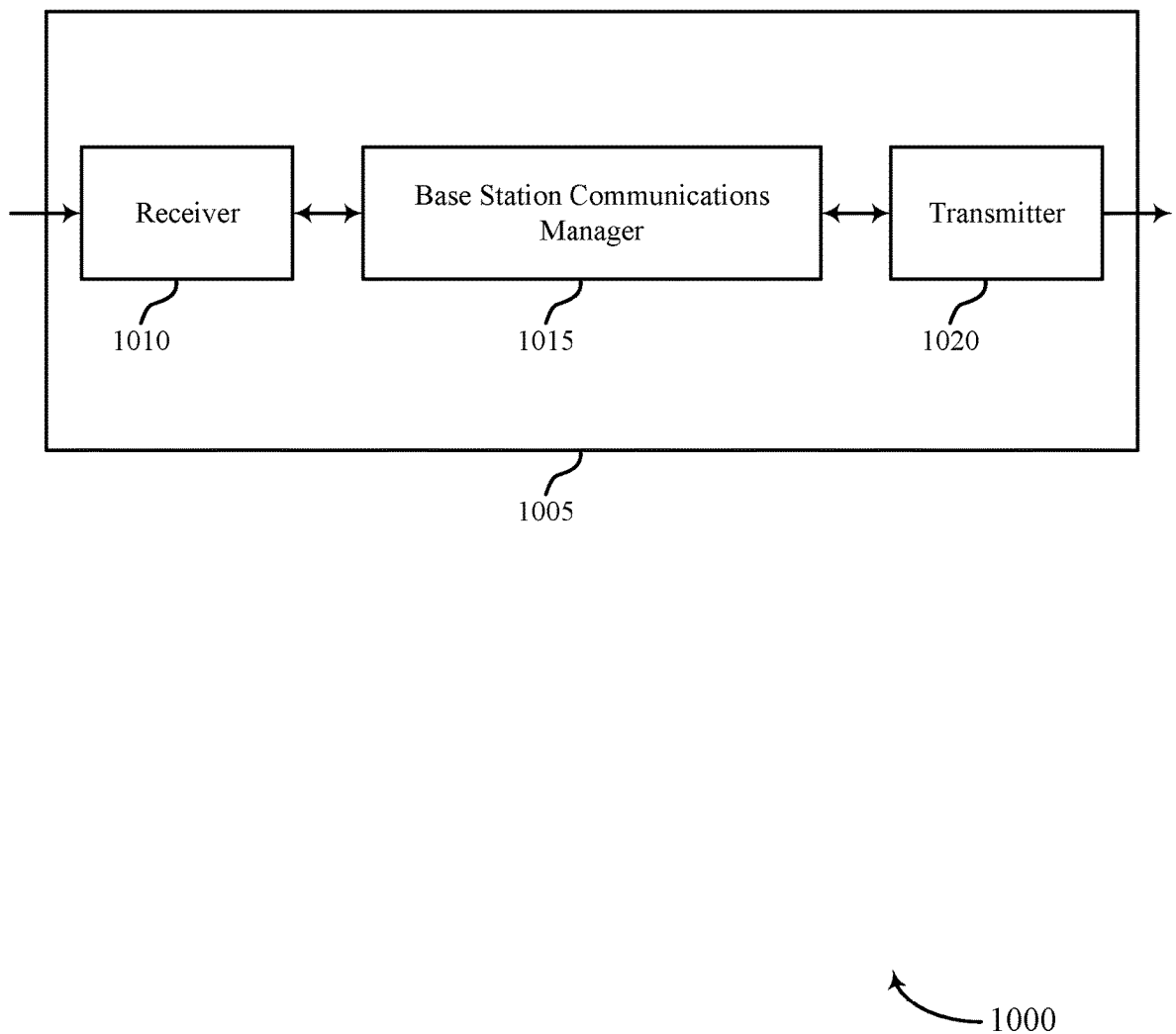
FIGS. 10 and 11 show block diagrams of devices that support acknowledgement design for multi-TCI state transmission in accordance with aspects of the present disclosure.

FIG. 10 shows a block diagram 1000 of a device 1005 that supports acknowledgement design for multi-TCI state transmission in accordance with aspects of the present disclosure. The device 1005 may be an example of aspects of a base station 105 as described herein. The device 1005 may include a receiver 1010, a UE communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to acknowledgement design for multi-TCI state transmission, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may transmit, during a transmission interval, a data transmission over a set of beamformed channels to a UE and, for each data transmission, a reference signal transmitted in conjunction with the data transmission, receive, from the UE and over an ACK/NACK signal, a feedback report indicating a result of a channel state measurement procedure for one or more of the set of beamformed channels using the data transmission, the reference signal, or a combination thereof, and perform, based on the feedback report, subsequent transmissions to the UE over the one or more beamformed channels. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
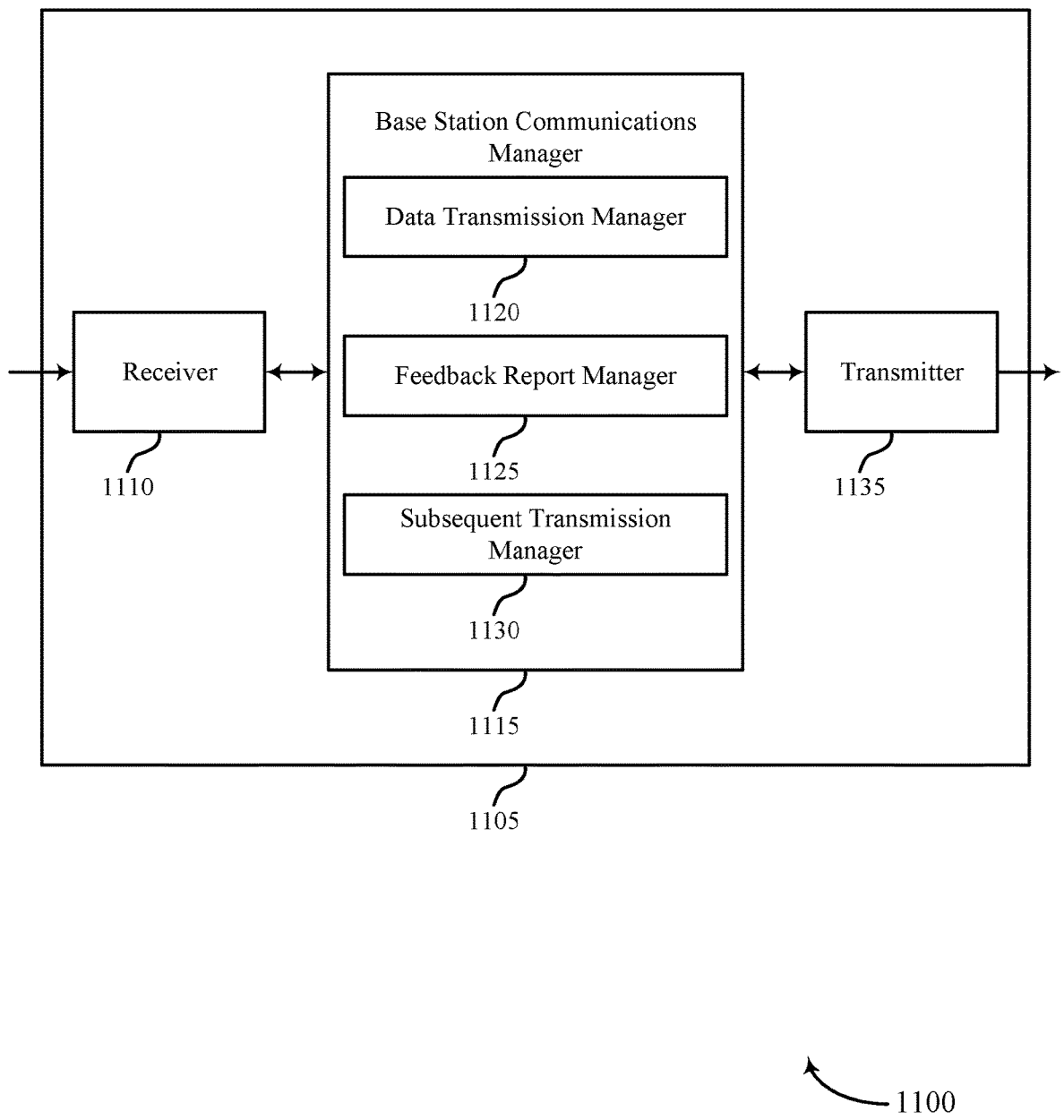

FIG. 11 shows a block diagram 1100 of a device 1105 that supports acknowledgement design for multi-TCI state transmission in accordance with aspects of the present disclosure. The device 1105 may be an example of aspects of a device 1005 or a base station 105 as described herein, including with reference to FIGS. 1-5 and 10. The device 1105 may include a receiver 1110, a base station communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to acknowledgement design for multi-TCI state transmission, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein, including with reference to FIG. 10. The base station communications manager 1115 may include a data transmission manager 1120, a feedback report manager 1125, and a subsequent transmission manager 1130. The base station communications manager 1115 may be an example of aspects of the base station communications manager 1310 described herein.

The data transmission manager 1120 may transmit, during a transmission interval, a data transmission over a set of beamformed channels to a UE and, for each data transmission, a reference signal transmitted in conjunction with the data transmission.

The feedback report manager 1125 may receive, from the UE and over an ACK/NACK signal, a feedback report indicating a result of a channel state measurement procedure for one or more of the set of beamformed channels using the data transmission, the reference signal, or a combination thereof.

The subsequent transmission manager 1130 may perform, based on the feedback report, subsequent transmissions to the UE over the one or more beamformed channels.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
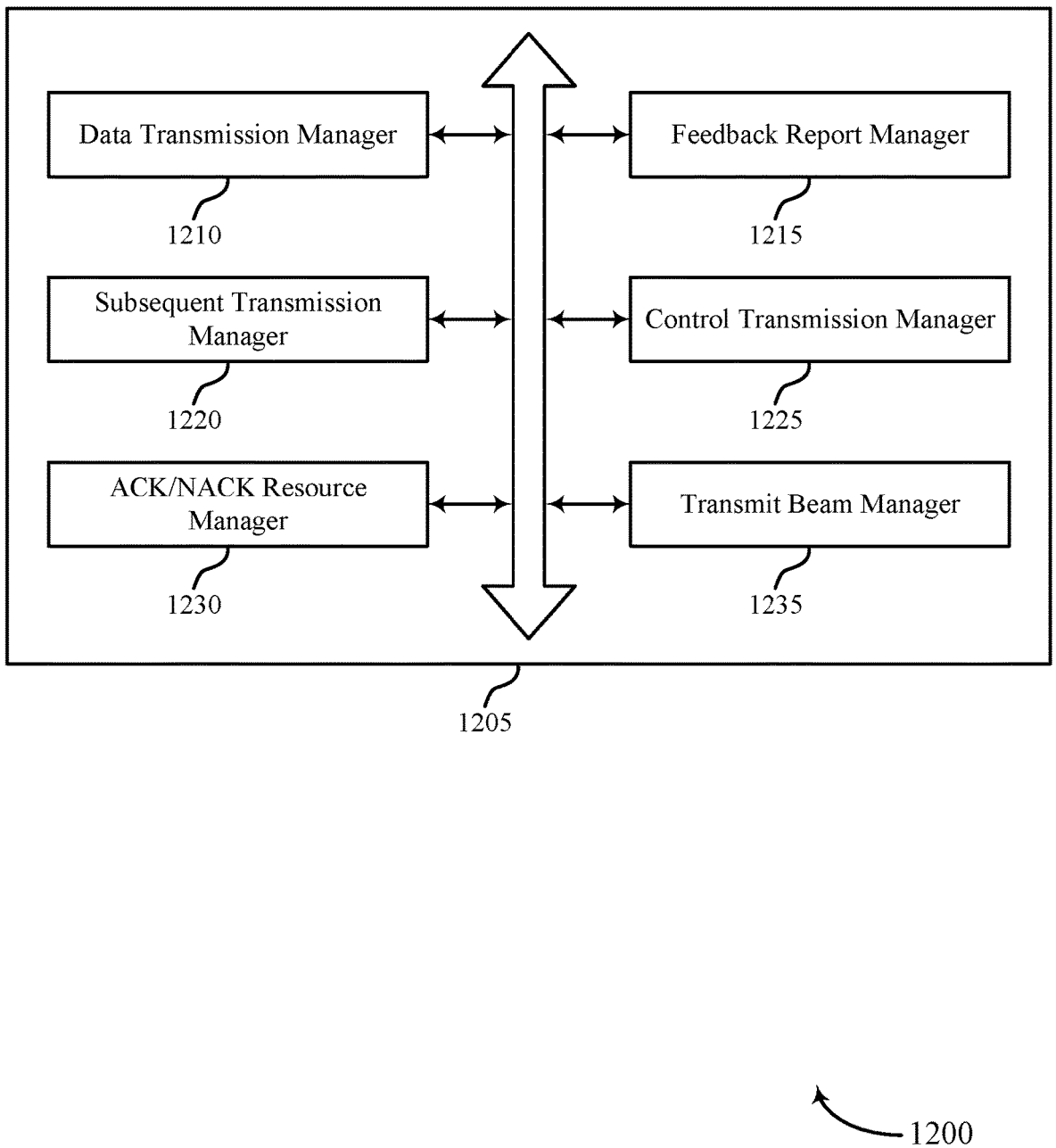
FIG. 12 shows a block diagram of a communications manager that supports acknowledgement design for multi-TCI state transmission in accordance with aspects of the present disclosure.

FIG. 12 shows a block diagram 1200 of a base station communications manager 1205 that supports acknowledgement design for multi-TCI state transmission in accordance with aspects of the present disclosure. The base station communications manager 1205 may be an example of aspects of a base station communications manager 1015, a base station communications manager 1115, or a base station communications manager 1310 described herein, including with reference to FIGS. 1-5, 10, 11, and 13. The base station communications manager 1205 may include a data transmission manager 1210, a feedback report manager 1215, a subsequent transmission manager 1220, a control transmission manager 1225, an ACK/NACK resource manager 1230, and a transmit beam manager 1235. Each of these modules may communicate, directly or indirectly, with one another (e.g., via one or more buses).

The data transmission manager 1210 may transmit, during a transmission interval, a data transmission over a set of beamformed channels to a UE and, for each data transmission, a reference signal transmitted in conjunction with the data transmission. In some examples, the feedback report indicates at least one of a SNR, a RSRP, a CQI, a RSRQ, or a combination thereof. In some examples, each of the set of beamformed channels corresponds to a channel using a corresponding TCI state beam. In some examples, the reference signal includes a DMRS.

The feedback report manager 1215 may receive, from the UE and over an ACK/NACK signal, a feedback report indicating a result of a channel state measurement procedure for one or more of the set of beamformed channels using the data transmission, the reference signal, or a combination thereof. In some examples, the feedback report manager 1215 may identify, based on the feedback report, a result of the channel state measurement procedure for the receive beam. In some examples the feedback report manager 1215 may perform subsequent transmissions to the UE.

In some examples, the feedback report indicates at least one of an indication of an absolute channel performance metric value for each of the one or more of the set of beamformed channels, a relative channel performance metric value for the one or more of the set of beamformed channels, an identifier for each of the one or more beamformed channels having a channel performance metric value satisfying a threshold, an identifier of at least one beamformed channel having a highest channel performance metric value, or a combination thereof.

The subsequent transmission manager 1220 may perform, based on the feedback report, subsequent transmissions to the UE over the one or more beamformed channels.

The control transmission manager 1225 may transmit a control transmission during the transmission interval using an antenna configuration that is QCL with respect to an antenna configuration used for the data transmission, where the channel state measurement procedure is performed using the control transmission.

The ACK/NACK resource manager 1230 may receive the feedback report over resources allocated for transmitting an ACK/NACK message.

The transmit beam manager 1235 may receive the feedback report over a transmit beam that is based on a receive beam used by the UE to receive the data transmission.

In some examples, the transmit beam manager 1235 may receive the feedback report over a set of transmit beams, each transmit beam associated with a corresponding receive beam used by the UE to receive the data transmission. In some examples, the transmit beam manager 1235 may transmit an indication to the UE identifying one or more transmit beams for the UE to use for communicating the feedback report over the ACK/NACK signal.

Figure 13:
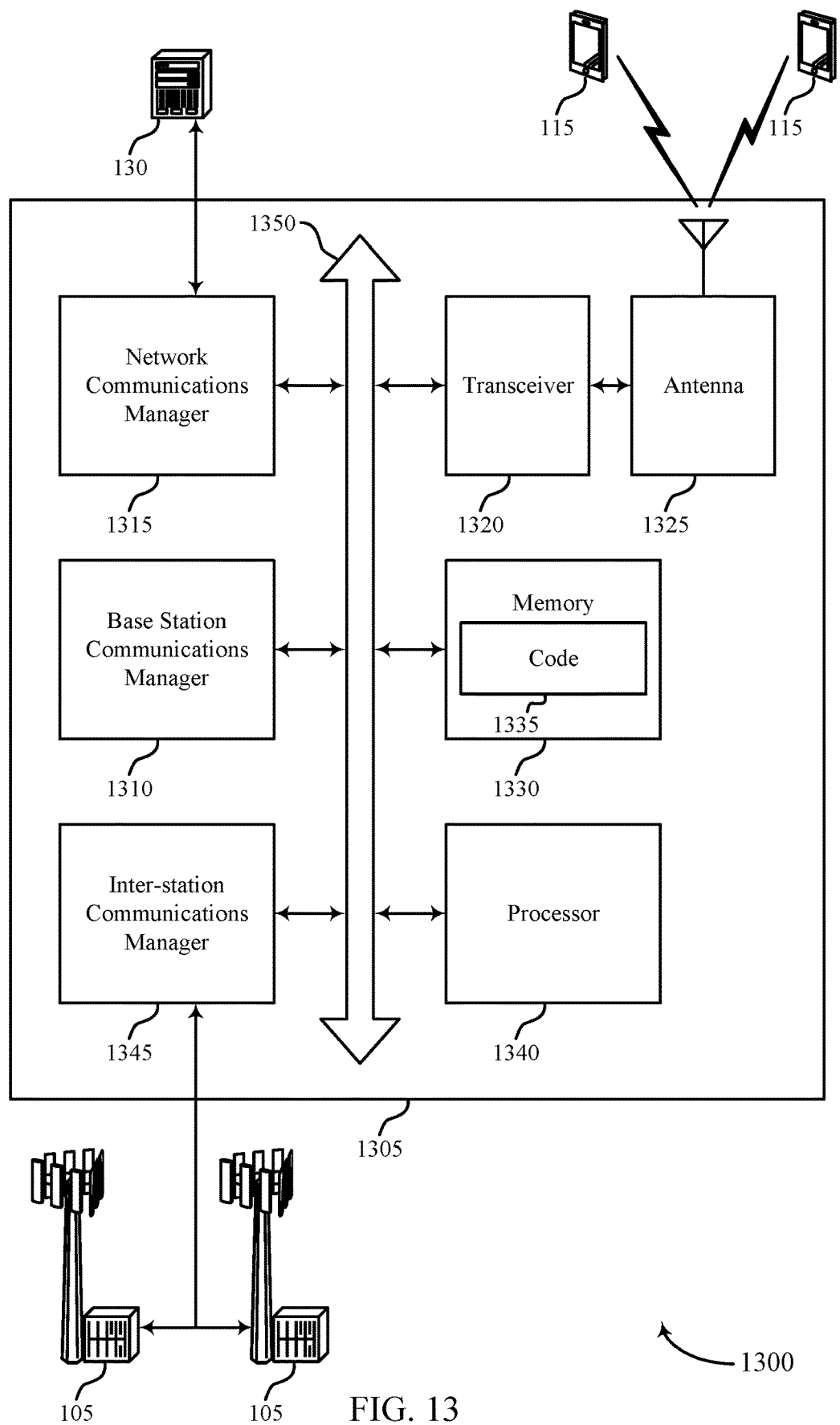
FIG. 13 shows a diagram of a system including a device that supports acknowledgement design for multi-TCI state transmission in accordance with aspects of the present disclosure.

FIG. 13 shows a diagram of a system 1300 including a device 1305 that supports acknowledgement design for multi-TCI state transmission in accordance with aspects of the present disclosure. The device 1305 may be an example of or include the components of device 1005, device 1105, or a base station 105 as described herein, including with reference to FIGS. 1, 10, and 11. The device 1305 may include components for bi-directional voice and data communications including components for transmitting and receiving communications, including a base station communications manager 1310, a network base station communications manager 1315, a transceiver 1320, an antenna 1325, memory 1330, a processor 1340, and an inter-station base station communications manager 1345. These components may be in electronic communication via one or more buses (e.g., bus 1350).

The base station communications manager 1310 may transmit, during a transmission interval, a data transmission over a set of beamformed channels to a UE and, for each data transmission, a reference signal transmitted in conjunction with the data transmission, receive, from the UE and over an ACK/NACK signal, a feedback report indicating a result of a channel state measurement procedure for one or more of the set of beamformed channels using the data transmission, the reference signal, or a combination thereof, and perform, based on the feedback report, subsequent transmissions to the UE over the one or more beamformed channels.

The network base station communications manager 1315 may manage communications with the core network (e.g., via one or more wired backhaul links). For example, the network base station communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some examples, the wireless device may include a single antenna 1325. However, in some examples the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some examples, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In some examples, a memory controller may be integrated into processor 1340. The processor 1340 may be configured to execute computer-readable instructions stored in a memory (e.g., the memory 1330) to cause the device #{device} to perform various functions (e.g., functions or tasks supporting acknowledgement design for multi-TCI state transmission).

The inter-station base station communications manager 1345 may manage communications with other base station 105, and may include a controller or scheduler for controlling communications with UEs 115 in cooperation with other base stations 105. For example, the inter-station base station communications manager 1345 may coordinate scheduling for transmissions to UEs 115 for various interference mitigation techniques such as beamforming or joint transmission. In some examples, the inter-station base station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some examples, the code 1335 may not be directly executable by the processor 1340 but may cause a computer (e.g., when compiled and executed) to perform functions described herein.

Figure 14:
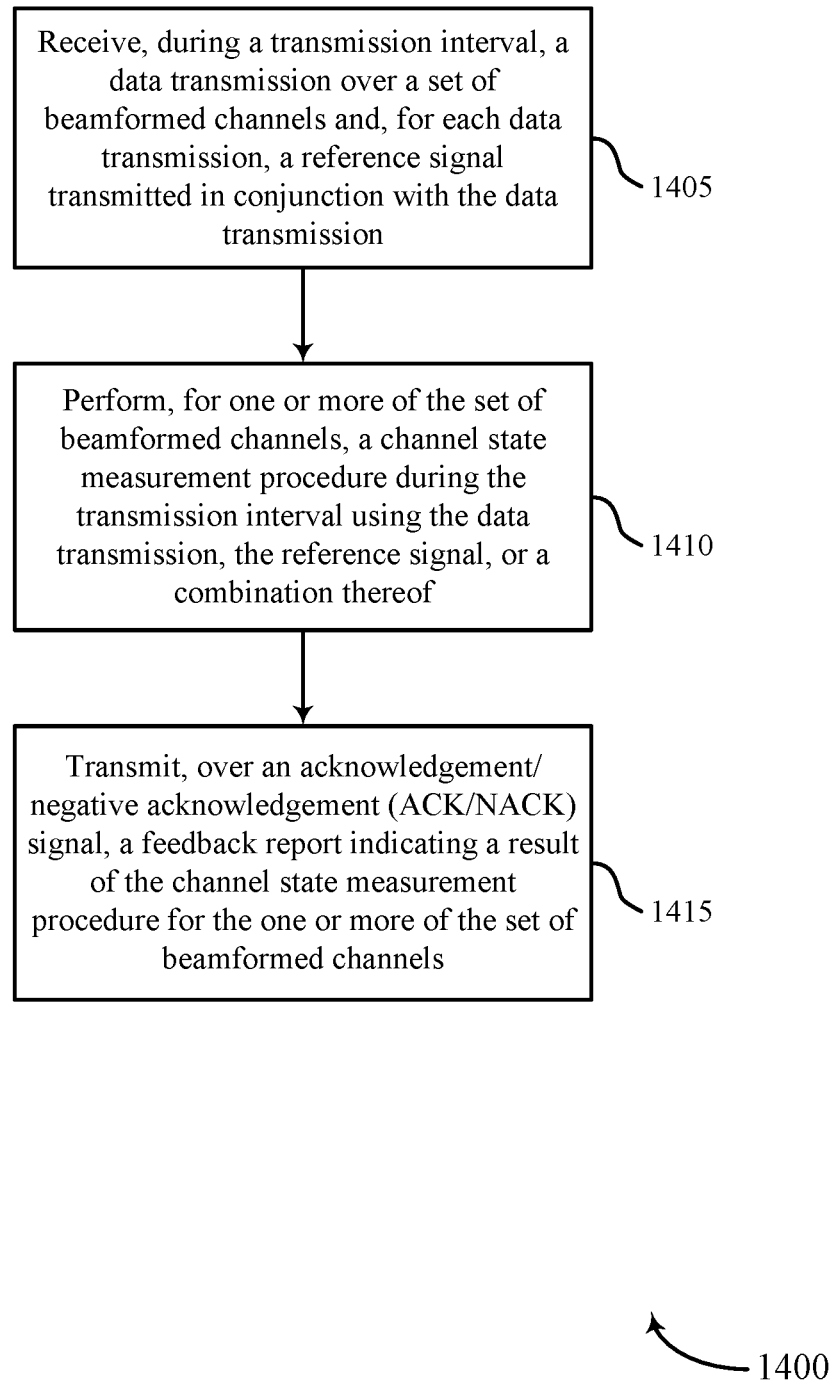
FIGS. 14 through 17 show flowcharts illustrating methods that support acknowledgement design for multi-TCI state transmission in accordance with aspects of the present disclosure.

FIG. 14 shows a flowchart illustrating a method 1400 that supports acknowledgement design for multi-TCI state transmission in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, during a transmission interval, a data transmission over a set of beamformed channels and, for each data transmission, a reference signal transmitted in conjunction with the data transmission. The operations of 1405 may be performed according to the methods described herein. In some examples, aspects of the operations of 1405 may be performed by a data transmission manager as described with reference to FIGS. 6 through 9.

At 1410, the UE may perform, for one or more of the set of beamformed channels, a channel state measurement procedure during the transmission interval using the data transmission, the reference signal, or a combination thereof. The operations of 1410 may be performed according to the methods described herein. In some examples, aspects of the operations of 1410 may be performed by a channel state measurement manager as described with reference to FIGS. 6 through 9.

At 1415, the UE may transmit, over an ACK/NACK signal, a feedback report indicating a result of the channel state measurement procedure for the one or more of the set of beamformed channels. The operations of 1415 may be performed according to the methods described herein. In some examples, aspects of the operations of 1415 may be performed by a feedback report manager as described with reference to FIGS. 6 through 9.

Figure 15:
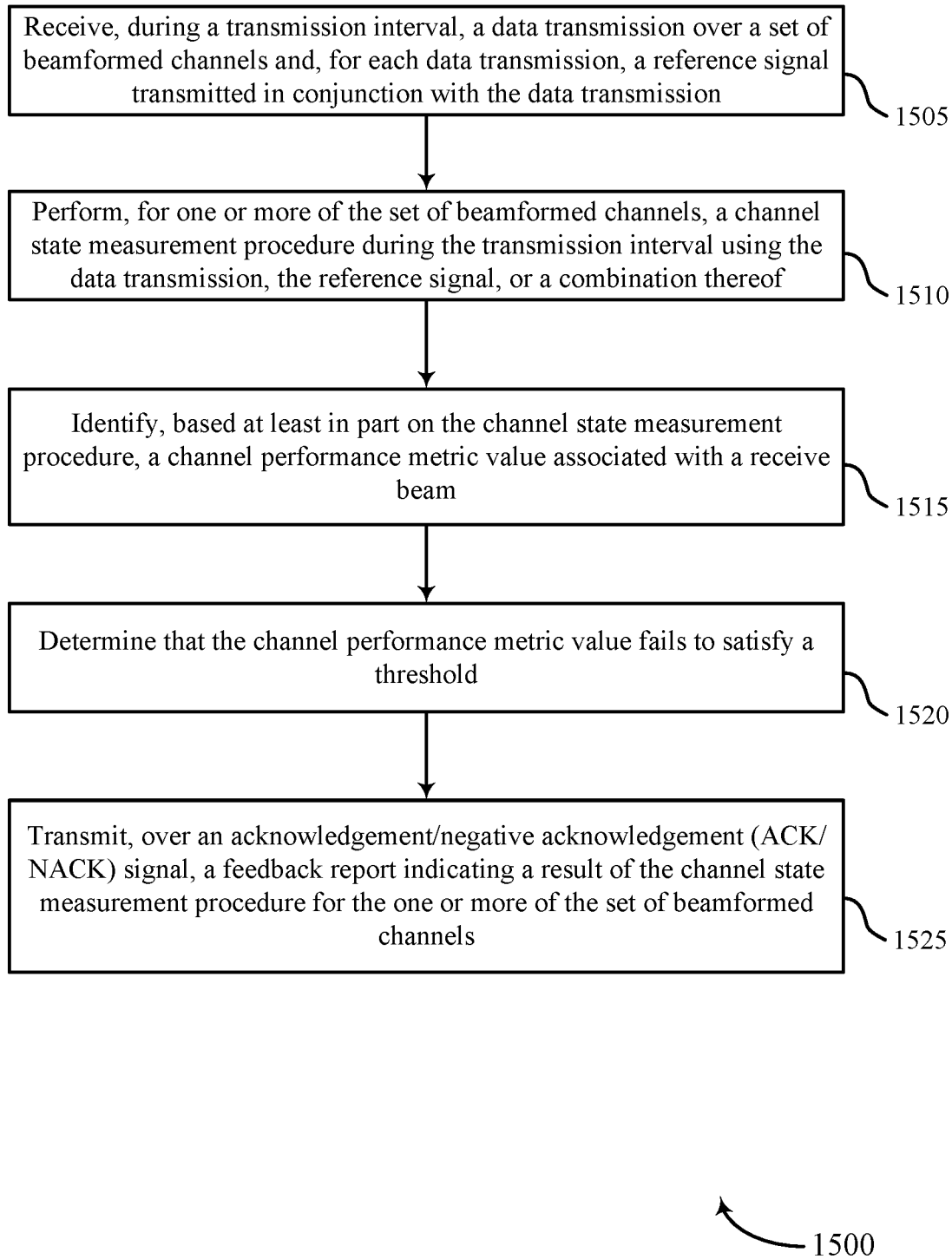

FIG. 15 shows a flowchart illustrating a method 1500 that supports acknowledgement design for multi-TCI state transmission in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, during a transmission interval, a data transmission over a set of beamformed channels and, for each data transmission, a reference signal transmitted in conjunction with the data transmission. The operations of 1505 may be performed according to the methods described herein. In some examples, aspects of the operations of 1505 may be performed by a data transmission manager as described with reference to FIGS. 6 through 9.

At 1510, the UE may perform, for one or more of the set of beamformed channels, a channel state measurement procedure during the transmission interval using the data transmission, the reference signal, or a combination thereof. The operations of 1510 may be performed according to the methods described herein. In some examples, aspects of the operations of 1510 may be performed by a channel state measurement manager as described with reference to FIGS. 6 through 9.

At 1515, the UE may identify, based at least in part on the channel state measurement procedure, a channel performance metric value associated with a receive beam. The operations of 1515 may be performed according to the methods described herein. In some examples, aspects of the operations of 1515 may be performed by a channel state measurement manager as described with reference to FIGS. 6 through 9.

At 1520, the UE may determine that the channel performance metric value fails to satisfy a threshold. The operations of 1520 may be performed according to the methods described herein. In some examples, aspects of the operations of 1520 may be performed by a channel state measurement manager as described with reference to FIGS. 6 through 9.

At 1525, the UE may transmit, over an ACK/NACK signal, a feedback report indicating a result of the channel state measurement procedure for the one or more of the set of beamformed channels. The operations of 1525 may be performed according to the methods described herein. In some examples, aspects of the operations of 1525 may be performed by a feedback report manager as described with reference to FIGS. 6 through 9.

Figure 16:
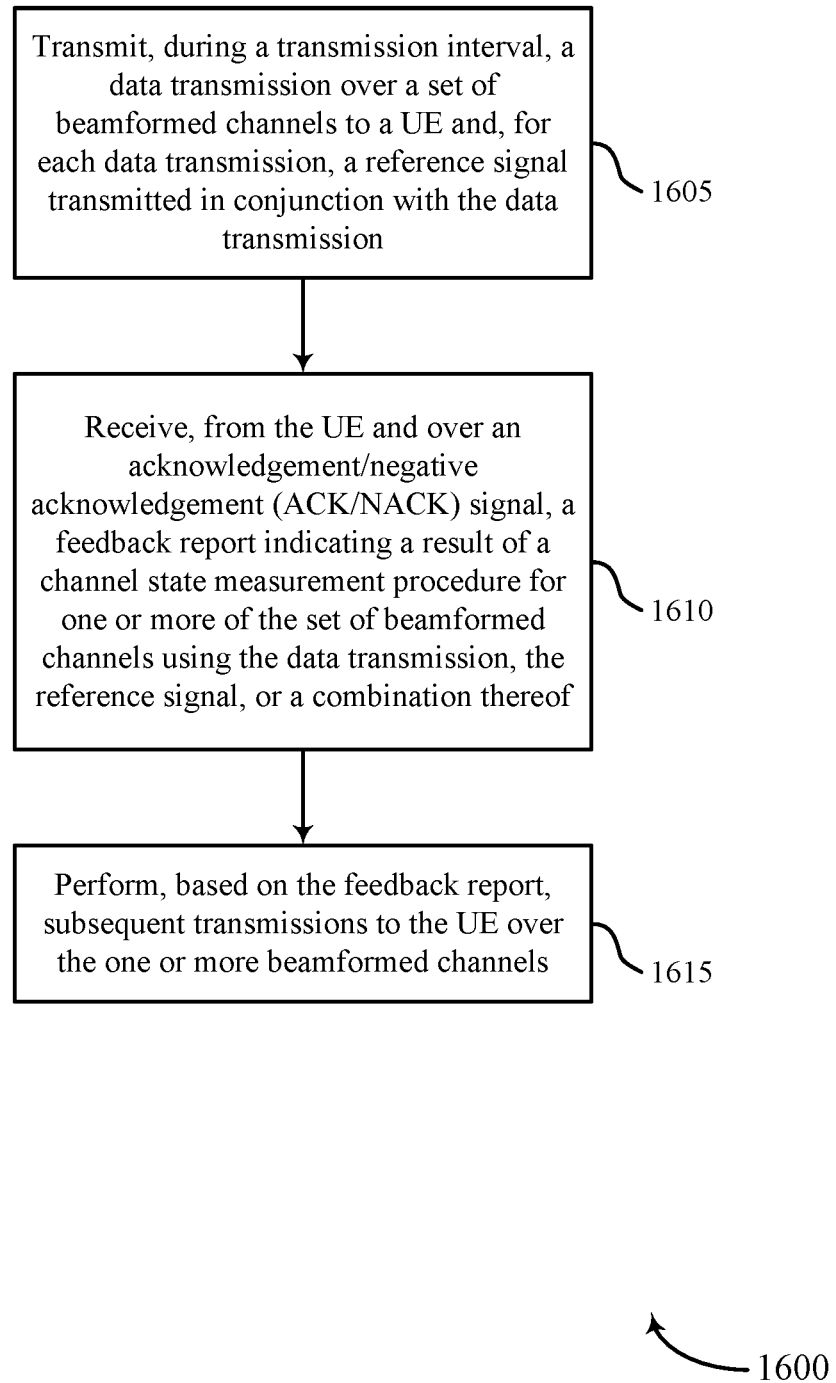

FIG. 16 shows a flowchart illustrating a method 1600 that supports acknowledgement design for multi-TCI state transmission in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit, during a transmission interval, a data transmission over a set of beamformed channels to a UE and, for each data transmission, a reference signal transmitted in conjunction with the data transmission. The operations of 1605 may be performed according to the methods described herein. In some examples, aspects of the operations of 1605 may be performed by a data transmission manager as described with reference to FIGS. 10 through 13.

At 1610, the base station may receive, from the UE and over an ACK/NACK signal, a feedback report indicating a result of a channel state measurement procedure for one or more of the set of beamformed channels using the data transmission, the reference signal, or a combination thereof. The operations of 1610 may be performed according to the methods described herein. In some examples, aspects of the operations of 1610 may be performed by a feedback report manager as described with reference to FIGS. 10 through 13.

At 1615, the base station may perform, based on the feedback report, subsequent transmissions to the UE over the one or more beamformed channels. The operations of 1615 may be performed according to the methods described herein. In some examples, aspects of the operations of 1615 may be performed by a subsequent transmission manager as described with reference to FIGS. 10 through 13.

Figure 17:
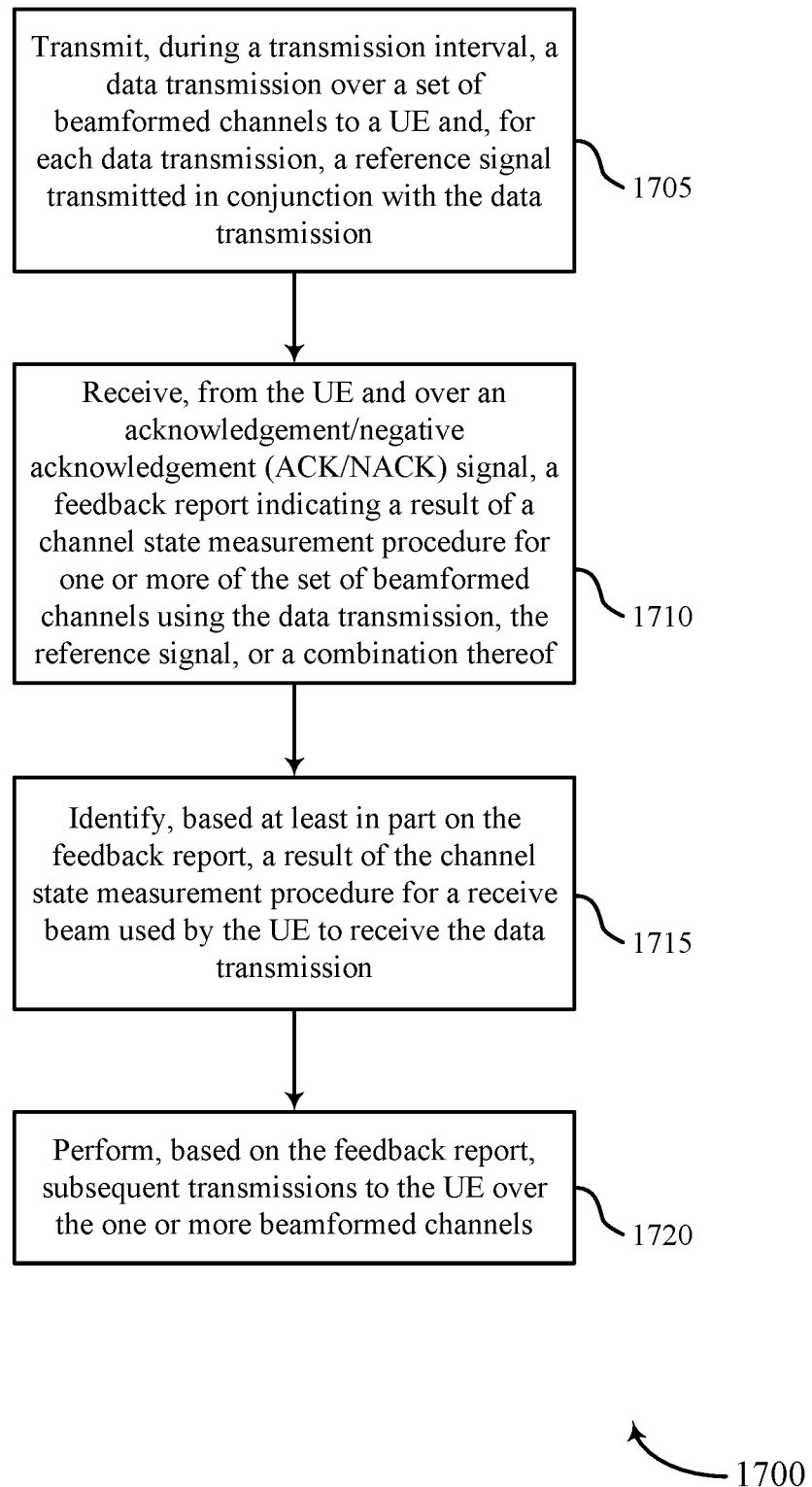

FIG. 17 shows a flowchart illustrating a method 1700 that supports acknowledgement design for multi-TCI state transmission in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, during a transmission interval, a data transmission over a set of beamformed channels to a UE and, for each data transmission, a reference signal transmitted in conjunction with the data transmission. The operations of 1705 may be performed according to the methods described herein. In some examples, aspects of the operations of 1705 may be performed by a data transmission manager as described with reference to FIGS. 10 through 13.

At 1710, the base station may transmit an indication to the UE identifying one or more transmit beams for the UE to use for communicating the feedback report over the ACK/NACK signal. The operations of 1710 may be performed according to the methods described herein. In some examples, aspects of the operations of 1710 may be performed by a transmit beam manager as described with reference to FIGS. 10 through 13.

At 1715, the base station may identify, based at least in part on the feedback report, a result of the channel state measurement procedure for a receive beam used by the UE to receive the data transmission. The operations of 1715 may be performed according to the methods described herein. In some examples, aspects of the operations of 1715 may be performed by a feedback report manager as described with reference to FIGS. 10 through 13.

At 1720, the base station may perform, based on the feedback report, subsequent transmissions to the UE over the one or more beamformed channels. The operations of 1720 may be performed according to the methods described herein. In some examples, aspects of the operations of 1720 may be performed by a subsequent transmission manager as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, during a slot, for each beamformed channel of a plurality of beamformed channels, a reference signal and a data transmission;
   performing, for each beamformed channel of the plurality of beamformed channels, a channel state measurement procedure using the reference signal and the data transmission received over that beamformed channel; and
   transmitting, to a base station, and in an acknowledgement message for the data transmission, a bit value indicating a beamformed channel of the plurality of beamformed channels having a highest channel measurement value of the plurality of beamformed channels, the channel measurement value based at least in part on performing the channel state measurement procedure, wherein the acknowledgement message is transmitted in the slot, and wherein the acknowledgement message is transmitted in a transmit beam corresponding to a receive beam in the slot having the highest channel measurement value.

2. The method of claim 1, further comprising:
   determining that a control transmission received during the slot is transmitted using an antenna configuration that is quasi-co-located (QCL) with respect to an antenna configuration used for the data transmission; and
   performing, for each of the plurality of beamformed channels, the channel state measurement procedure during the slot using the control transmission.

3. The method of claim 1, further comprising:
   identifying, for each of the plurality of beamformed channels, a receive beam used to receive the data transmission; and
   selecting, based at least in part on the receive beam, a transmit beam to use for transmitting a feedback report, wherein the feedback report is based at least in part on the channel state measurement procedure.

4. The method of claim 3, further comprising:
   transmitting the feedback report over a plurality of transmit beams, each transmit beam associated with a corresponding receive beam used to receive the data transmission.

5. The method of claim 1, further comprising:
   transmitting a feedback report based at least in part on the channel state measurement procedure, wherein the feedback report indicates at least one of a signal-to-noise ratio (SNR), a reference signal received power (RSRP), a channel quality indicator (CQI), a reference signal received quality (RSRQ), or a combination thereof.

6. The method of claim 5, wherein the feedback report indicates at least one of an indication of an absolute channel performance metric value for each of one or more of the plurality of beamformed channels, a relative channel performance metric value for the one or more of the plurality of beamformed channels, an identifier for each of the one or more beamformed channels having a channel performance metric value satisfying a threshold, an identifier of at least one beamformed channel having a highest channel performance metric value, or a combination thereof.

7. The method of claim 1, wherein each of the plurality of beamformed channels corresponds to a channel using a corresponding transmission control indicator (TCI) state beam.

8. The method of claim 1, wherein the reference signal comprises a demodulation reference signal (DMRS).

9. A method for wireless communication at a base station, comprising:
   transmitting, during a slot, for each beamformed channel of a plurality of beamformed channels a reference signal and a data transmission;
   receiving, from a user equipment (UE), in an acknowledgement message for the data transmission, a bit value indicating a beamformed channel of the plurality of beamformed channels having a highest channel measurement value of the plurality of beamformed channels, wherein the channel measurement value is based at least in part on a channel state measurement procedure, wherein the acknowledgement message is received in the slot, and wherein the acknowledgement message is received in a receive beam corresponding to a transmit beam in the slot having the highest channel measurement value; and
   performing, based at least in part on the bit value, subsequent transmissions to the UE over the beamformed channel of the plurality of beamformed channels having the highest channel measurement value.

10. The method of claim 9, further comprising:
transmitting a control transmission during the slot using an antenna configuration that is quasi-co-located (QCL) with respect to an antenna configuration used for the data transmission, wherein the channel state measurement procedure is performed using the control transmission.

11. The method of claim 9, further comprising:
receiving a feedback report over the receive beam that is based at least in part on a beam used by the UE to receive the data transmission, the feedback report based at least in part on the channel state measurement procedure.

12. The method of claim 11, further comprising:
identifying, based at least in part on the feedback report, a result of the channel state measurement procedure for the receive beam.

13. The method of claim 11, further comprising:
receiving the feedback report over a plurality of transmit beams, each transmit beam associated with a corresponding receive beam used by the UE to receive the data transmission.

14. The method of claim 11, wherein the feedback report indicates at least one of a signal-to-noise ratio (SNR), a reference signal received power (RSRP), a channel quality indicator (CQI), a reference signal received quality (RSRQ), or a combination thereof.

15. The method of claim 11, wherein the feedback report indicates at least one of an indication of an absolute channel performance metric value for each of one or more of the plurality of beamformed channels, a relative channel performance metric value for the one or more of the plurality of beamformed channels, an identifier for each of the one or more beamformed channels having a channel performance metric value satisfying a threshold, an identifier of at least one beamformed channel having a highest channel performance metric value, or a combination thereof.

16. The method of claim 9, wherein each of the plurality of beamformed channels corresponds to a channel using a corresponding transmission configuration indicator (TCI) state beam.

17. The method of claim 9, wherein the reference signal comprises a demodulation reference signal (DMRS).

18. An apparatus for wireless communication at a user equipment (UE), comprising: a processor, memory in electronic communication with the processor; and instructions stored in the memory and executable by the processor to cause the apparatus to:
receive, during a slot, for each beamformed channel of a plurality of beamformed channels, a reference signal and a data transmission;
perform, for each beamformed channel of the plurality of beamformed channels, a channel state measurement procedure using the reference signal and the data transmission received over that beamformed channel; and
transmit, to a base station, and in an acknowledgement message for the data transmission, a bit value indicating a beamformed channel of the plurality of beamformed channels having a highest channel measurement value of the plurality of beamformed channels, the channel measurement value based at least in part on performing the channel state measurement procedure, wherein the acknowledgement message is transmitted in the slot, and wherein the acknowledgement message is transmitted in a transmit beam corresponding to a receive beam in the slot having the highest channel measurement value.

19. The apparatus of claim 18, wherein the instructions are further executable by the processor to cause the apparatus to:
determine that a control transmission received during the slot is transmitted using an antenna configuration that is quasi-co-located (QCL) with respect to an antenna configuration used for the data transmission; and
perform, for each of the plurality of beamformed channels, the channel state measurement procedure during the slot using the control transmission.

20. The apparatus of claim 18, wherein the instructions are further executable by the processor to cause the apparatus to:
identify, for each of the plurality of beamformed channels, a receive beam used to receive the data transmission; and
select, based at least in part on the receive beam, a transmit beam to use for transmitting a feedback report, wherein the feedback report is based at least in part on the channel state measurement procedure.

21. An apparatus for wireless communication at a base station, comprising: a processor, memory in electronic communication with the processor; and instructions stored in the memory and executable by the processor to cause the apparatus to:
transmit, during a slot, for each beamformed channel of a plurality of beamformed channels, a reference signal and a data transmission;
receive, from a user equipment (UE), in an acknowledgement message for the data transmission, a bit value indicating a beamformed channel of the plurality of beamformed channels having a highest channel measurement value of the plurality of beamformed channels, wherein the channel measurement value is based at least in part on a channel state measurement procedure, wherein the acknowledgement message is received in the slot, and wherein the acknowledgement message is received in a receive beam corresponding to a transmit beam in the slot having the highest channel measurement value; and
perform, based at least in part on the bit value, subsequent transmissions to the UE over the beamformed channel of the plurality of beamformed channels having the highest channel measurement value.

22. The apparatus of claim 21, wherein the instructions are further executable by the processor to cause the apparatus to:
transmit a control transmission during the slot using an antenna configuration that is quasi-co-located (QCL) with respect to an antenna configuration used for the data transmission, wherein the channel state measurement procedure is performed using the control transmission.

23. The apparatus of claim 21, wherein the instructions are further executable by the processor to cause the apparatus to:
- receive a feedback report over the receive beam that is based at least in part on a beam used by the UE to receive the data transmission, the feedback report based at least in part on the channel state measurement procedure;
- identify, based at least in part on the feedback report, a result of the channel state measurement procedure for the receive beam.

* * * * *